United States Patent
Pandey et al.

(10) Patent No.: US 12,530,266 B2
(45) Date of Patent: *Jan. 20, 2026

(54) IN-PLACE CLOUD INSTANCE RESTORE

(71) Applicant: Rubrik, Inc., Palo Alto, CA (US)

(72) Inventors: Prateek Pandey, Santa Clara, CA (US); Shashank Jain, Mountain View, CA (US); Vikas Jain, Bangalore (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/957,553

(22) Filed: Nov. 22, 2024

(65) Prior Publication Data

US 2025/0086069 A1 Mar. 13, 2025

Related U.S. Application Data

(63) Continuation of application No. 18/056,200, filed on Nov. 16, 2022, now Pat. No. 12,181,982, which is a
(Continued)

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 11/1464* (2013.01);
(Continued)

(58) Field of Classification Search
CPC .................................................. G06F 11/1469
See application file for complete search history.

(56) References Cited

U.S. PATENT DOCUMENTS 7,124,171 B1   10/2006   McCann
7,797,279 B1   9/2010   Starling et al.
(Continued)

FOREIGN PATENT DOCUMENTS

EP   3215940 A2   9/2017
EP   3567482 A1   11/2019
WO   2016/073625 A2   5/2016

OTHER PUBLICATIONS

Lorenz et al. (CN-101154234-A), "System And Method For Managing Data Versions", Apr. 2, 2008, 11 pages. (Year: 2008).
(Continued)

*Primary Examiner* — Van H Oberly
(74) *Attorney, Agent, or Firm* — Holland & Hart LLP

(57) ABSTRACT

The disclosed technology teaches recovering a first virtual machine or an instance with an Internet Protocol address, a first root volume and one or more data volumes that are corrupted. The first virtual machine is hosted by a first cloud server that hosts plurality of virtual machines. The disclosed technology includes instructing the first cloud server to launch a recovery virtual machine. The recovery virtual machine launches one or more new data volumes based upon captured file system images in one or more snapshots taken of corrupted data volumes of the first virtual machine prior to becoming corrupted. The recovery virtual machine detaches the corrupted data volumes and attaches the new data volumes launched to the first virtual machine. The Internet Protocol address of the first virtual machine remains unchanged.

20 Claims, 19 Drawing Sheets

Related U.S. Application Data continuation of application No. 17/738,629, filed on May 6, 2022, now Pat. No. 11,829,263, which is a continuation of application No. 15/826,463, filed on Nov. 29, 2017, now Pat. No. 11,372,729.

(52) U.S. Cl.
CPC .............. *G06F 2009/45575* (2013.01); *G06F 2009/45583* (2013.01); *G06F 2009/45595* (2013.01); *G06F 2201/84* (2013.01)

(56) References Cited

U.S. PATENT DOCUMENTS

| | | |
|---|---|---|
| 8,046,547 B1 | 10/2011 | Chatterjee et al. |
| 8,060,476 B1 | 11/2011 | Afonso et al. |
| 8,135,930 B1 | 3/2012 | Mattox et al. |
| 8,234,469 B2 | 7/2012 | Ranade |
| 8,315,985 B1 | 11/2012 | Ohr et al. |
| 8,332,689 B2 | 12/2012 | Timashev et al. |
| 8,341,365 B2 | 12/2012 | Murase et al. |
| 8,359,594 B1 | 1/2013 | Davidson et al. |
| 8,375,003 B1 | 2/2013 | Afonso et al. |
| 8,402,309 B2 | 3/2013 | Timashev et al. |
| 8,566,326 B2 | 10/2013 | Hu et al. |
| 8,589,350 B1 | 11/2013 | Lalonde et al. |
| 8,645,950 B2 | 2/2014 | Fries et al. |
| 8,712,978 B1 | 4/2014 | Shilane et al. |
| 8,725,871 B2 | 5/2014 | Ding et al. |
| 8,732,411 B1 | 5/2014 | Chatterjee et al. |
| 8,756,197 B1 | 6/2014 | Wilde et al. |
| 8,910,156 B1 | 12/2014 | Kenchammana-Hosekote et al. |
| 8,984,221 B2 | 3/2015 | Satoyama et al. |
| 9,037,534 B1 | 5/2015 | Kolesnikov |
| 9,047,238 B2 | 6/2015 | Zaslavsky et al. |
| 9,116,846 B2 | 8/2015 | Vasilyev et al. |
| 9,213,512 B1 | 12/2015 | Montierth et al. |
| 9,213,572 B2 | 12/2015 | Farkas et al. |
| 9,292,327 B1 | 3/2016 | Von et al. |
| 9,311,318 B1 | 4/2016 | Afonso et al. |
| 9,372,825 B1 | 6/2016 | Shee |
| 9,465,518 B1 | 10/2016 | Koryakina et al. |
| 9,515,905 B1 | 12/2016 | Blanding et al. |
| 9,521,198 B1 | 12/2016 | Agarwala et al. |
| 9,536,546 B2 | 1/2017 | Motta et al. |
| 9,569,124 B2 | 2/2017 | Jain et al. |
| 9,697,268 B1 | 7/2017 | Prater et al. |
| 9,715,346 B2 | 7/2017 | Jain et al. |
| 9,824,095 B1 | 11/2017 | Taylor et al. |
| 10,007,445 B2 | 6/2018 | Nithrakashyap et al. |
| 10,114,564 B2 | 10/2018 | Jain et al. |
| 10,114,565 B2 | 10/2018 | Nithrakashyap et al. |
| 10,133,495 B2 | 11/2018 | Jain et al. |
| 10,140,303 B1 | 11/2018 | Patterson |
| 10,241,691 B2 | 3/2019 | Jain et al. |
| 10,282,112 B2 | 5/2019 | Jain et al. |
| 10,303,555 B1 | 5/2019 | Lee |
| 10,346,354 B2 | 7/2019 | Kushwah et al. |
| 10,423,342 B1 | 9/2019 | Chheda et al. |
| 10,678,448 B2 | 6/2020 | Jain et al. |
| 10,824,589 B2 | 11/2020 | Jain et al. |
| 11,079,941 B2 | 8/2021 | Jain et al. |
| 11,221,920 B2 | 1/2022 | Mazumdar |
| 11,334,438 B2 | 5/2022 | Mazumdar |
| 11,354,046 B2 | 6/2022 | Jain et al. |
| 11,372,729 B2 | 6/2022 | Pandey et al. |
| 2001/0044807 A1 | 11/2001 | Kleiman et al. |
| 2002/0176193 A1 | 11/2002 | Coonen |
| 2003/0115433 A1 | 6/2003 | Kodama |
| 2003/0131278 A1 | 7/2003 | Fujibayashi |
| 2003/0182313 A1 | 9/2003 | Federwisch et al. |
| 2004/0085965 A1 | 5/2004 | Fotedar |
| 2004/0139128 A1 | 7/2004 | Becker et al. |
| 2004/0210885 A1 | 10/2004 | Wang et al. |
| 2005/0108486 A1 | 5/2005 | Sandorfi |
| 2005/0187992 A1 | 8/2005 | Prahlad et al. |
| 2007/0136395 A1 | 6/2007 | Fries et al. |
| 2007/0156794 A1 | 7/2007 | Kisley et al. |
| 2007/0294563 A1 | 12/2007 | Bose |
| 2008/0013830 A1 | 1/2008 | Patterson et al. |
| 2008/0256311 A1 | 10/2008 | Lee |
| 2009/0043873 A1 | 2/2009 | Barsness et al. |
| 2009/0150879 A1 | 6/2009 | Raghunath |
| 2010/0049929 A1 | 2/2010 | Nagarkar et al. |
| 2010/0070726 A1 | 3/2010 | Ngo et al. |
| 2010/0077165 A1* | 3/2010 | Lu ...................... G06F 11/1451 711/E12.001 |
| 2010/0138827 A1 | 6/2010 | Frank et al. |
| 2010/0223428 A1 | 9/2010 | Wayda et al. |
| 2010/0306484 A1 | 12/2010 | Obr et al. |
| 2011/0154331 A1 | 6/2011 | Ciano et al. |
| 2011/0191356 A1 | 8/2011 | Gazula |
| 2011/0191559 A1 | 8/2011 | Li et al. |
| 2011/0213765 A1 | 9/2011 | Cui et al. |
| 2011/0265085 A1 | 10/2011 | Kedem et al. |
| 2011/0307886 A1* | 12/2011 | Thanga ................. G06F 9/5077 718/1 |
| 2011/0320882 A1 | 12/2011 | Beaty et al. |
| 2012/0072393 A1 | 3/2012 | Kumar et al. |
| 2012/0130956 A1 | 5/2012 | Caputo |
| 2012/0131480 A1 | 5/2012 | Kalmbach et al. |
| 2012/0144391 A1 | 6/2012 | Ueda |
| 2012/0158709 A1 | 6/2012 | Gaonkar et al. |
| 2012/0191931 A1 | 7/2012 | Bricker et al. |
| 2012/0192175 A1 | 7/2012 | Dorai et al. |
| 2012/0246645 A1 | 9/2012 | Iikura et al. |
| 2012/0254131 A1 | 10/2012 | Al et al. |
| 2012/0265732 A1 | 10/2012 | Gokhale et al. |
| 2012/0284233 A1 | 11/2012 | Otani |
| 2012/0324446 A1 | 12/2012 | Fries et al. |
| 2013/0080397 A1 | 3/2013 | Payne et al. |
| 2013/0132954 A1 | 5/2013 | Bolte et al. |
| 2013/0145105 A1 | 6/2013 | Sawicki et al. |
| 2013/0191347 A1 | 7/2013 | Bensinger |
| 2013/0262387 A1 | 10/2013 | Varadharajan et al. |
| 2013/0305344 A1 | 11/2013 | Alicherry et al. |
| 2013/0346976 A1 | 12/2013 | Robinson et al. |
| 2014/0047268 A1 | 2/2014 | Timashev et al. |
| 2014/0052698 A1 | 2/2014 | Chen et al. |
| 2014/0095817 A1 | 4/2014 | Hsu et al. |
| 2014/0115579 A1 | 4/2014 | Kong |
| 2014/0130040 A1 | 5/2014 | Lemanski |
| 2014/0188807 A1 | 7/2014 | Al-Kiswany et al. |
| 2014/0201163 A1 | 7/2014 | Tipton et al. |
| 2014/0229440 A1 | 8/2014 | Venkatesh et al. |
| 2014/0244935 A1 | 8/2014 | Ezra et al. |
| 2014/0258238 A1 | 9/2014 | Jin et al. |
| 2014/0279909 A1 | 9/2014 | Sudarsanam et al. |
| 2014/0297603 A1 | 10/2014 | Kim et al. |
| 2014/0325182 A1 | 10/2014 | Varakur et al. |
| 2015/0012920 A1 | 1/2015 | De et al. |
| 2015/0067283 A1 | 3/2015 | Basu et al. |
| 2015/0067390 A1 | 3/2015 | Blake |
| 2015/0242283 A1* | 8/2015 | Simoncelli .......... G06F 11/1456 711/162 |
| 2015/0244775 A1 | 8/2015 | Vibhor et al. |
| 2015/0277802 A1 | 10/2015 | Oikarinen et al. |
| 2015/0277952 A1 | 10/2015 | Lin et al. |
| 2015/0301903 A1 | 10/2015 | Mutha et al. |
| 2015/0324215 A1 | 11/2015 | Borthakur |
| 2015/0331744 A1 | 11/2015 | Slik |
| 2016/0004718 A1 | 1/2016 | Lin et al. |
| 2016/0026485 A1 | 1/2016 | Araujo |
| 2016/0026492 A1 | 1/2016 | Son et al. |
| 2016/0042761 A1 | 2/2016 | Motta et al. |
| 2016/0048408 A1 | 2/2016 | Madhu et al. |
| 2016/0124665 A1 | 5/2016 | Jain et al. |
| 2016/0124676 A1 | 5/2016 | Jain et al. |
| 2016/0124764 A1 | 5/2016 | Nithrakashyap et al. |
| 2016/0124972 A1 | 5/2016 | Jain et al. |
| 2016/0124977 A1 | 5/2016 | Jain et al. |
| 2016/0124978 A1 | 5/2016 | Nithrakashyap et al. |
| 2016/0125058 A1 | 5/2016 | Jain et al. |
| 2016/0125059 A1 | 5/2016 | Jain et al. |

(56) References Cited

U.S. PATENT DOCUMENTS

| | | |
|---|---|---|
| 2016/0127307 A1 | 5/2016 | Jain et al. |
| 2016/0139836 A1 | 5/2016 | Nallathambi et al. |
| 2016/0142483 A1 | 5/2016 | Nallathambi et al. |
| 2017/0139729 A1* | 5/2017 | Cropper .................... G06F 9/50 |
| 2018/0059973 A1 | 3/2018 | Jain et al. |
| 2018/0121453 A1 | 5/2018 | Jain et al. |
| 2018/0121454 A1 | 5/2018 | Kushwah et al. |
| 2018/0232278 A1 | 8/2018 | Kumarasamy et al. |
| 2018/0302439 A1* | 10/2018 | Hoffmann ............... H04L 63/16 |
| 2018/0373879 A1* | 12/2018 | Lango ................. H04L 63/0428 |
| 2019/0108098 A1 | 4/2019 | Mazumdar |
| 2019/0108099 A1 | 4/2019 | Mazumdar |
| 2019/0163580 A1 | 5/2019 | Pandey et al. |
| 2019/0171374 A1 | 6/2019 | Jain et al. |
| 2020/0210075 A1 | 7/2020 | Jain et al. |
| 2022/0244864 A1 | 8/2022 | Jain et al. |
| 2022/0261315 A1 | 8/2022 | Mazumdar |
| 2022/0318103 A1 | 10/2022 | Pandey et al. |
| 2023/0081841 A1 | 3/2023 | Pandey et al. |

OTHER PUBLICATIONS

"European Application Serial No. 15795291.2, Communication Pursuant to Article 94(3) EPC dated Feb. 15, 2018", 3 pages.

"European Application Serial No. 15795291.2, Communication Pursuant to Article 94(3) EPC dated Jul. 23, 2018", 7 pages.

"European Application Serial No. 15795291.2, Office Action dated May 11, 2018", 3 pages.

Baier et al., Security Aspects of Piecewise Hasing in Computer Forensics, IT Security Incident Management and IT Forensics (IMF), 2011 Sixth International Conference on IEEE (May 10, 2011), 16 pages.

PCT International Search Report and Written Opinion of the International Searching Authority, mailed Apr. 22, 2016, PCT Patent Application No. PCT/US2015/059063.

\* cited by examiner

⟵ 700

Edit SLA Domain

Gold
___

Service Level Agreement

Choose how often we take snapshots and the length of time we keep them.

| Snapshot | Every (Hours) | | For (Hours) |
|---|---|---|---|
| Take Snapshots: | 4 | Keep Snapshots: | 30 |
| 734 ⌇ | Every (Days) | 748 ⌇ | For (Days) |
| | 1 | | 30 |
| 744 ⌇ | Every (Months) | 758 ⌇ | For (Months) |
| | 1 | | 1 |
| 754 ⌇ | Every (Years) | 768 ⌇ | For (Years) |
| | 1 | | 2 |
| 764 ⌇ | | 778 ⌇ | |

Local retention set to 2 Years.

Snapshot Window

Take snapshots from: _____ ▼ to _____ ▼

Take first full between: First Opportunity ▼ at _____ ▼

774 ⌇

Cancel     Configure Remote Settings     [ Edit ]

Browse Files

You have selected a snapshot of 'dynapod-colo-2068-105-9-105-196-ubuntu-1' from 10/23/2017 3:41 AM dynapod-colo-2068-105-9-105-196-ubuntu-1

| | Name | Size | Last Modified | |
|---|---|---|---|---|
| 📁 | bin | 6.3 MB | 10/17/2014 | ⋯ |
| 📁 | boot | 19.7 MB | 08... | ⋯ |
| 📁 | etc | 2.6 MB | 10/20/2014 | ⋯ |
| 📁 | home | 115.4 kB | 07/16/2014 | ⋯ |
| 📄 | initrd.img | 5.5 MB | 07/16/2014 | ⋯ |
| 📁 | lib | 57.6 MB | 07/16/2014 | ⋯ |
| 📁 | lost+found | 16.4 kB | 07/16/2014 | ⋯ |
| 📁 | media | 32.3 kB | 07/16/2014 | ⋯ |

1302 — Download / Restore

FIG. 13

IN-PLACE CLOUD INSTANCE RESTORE

CROSS REFERENCE TO RELATED APPLICATIONS

This application is a continuation of U.S. patent application Ser. No. 18/056,200 by Pandey et al., entitled "In-Place Cloud Instance Restore," filed Nov. 16, 2022, which is a continuation of U.S. patent application Ser. No. 17/738,629 by Pandey et al., entitled "In-Place Cloud Instance Restore," filed May 6, 2022, now U.S. Pat. No. 11,829,263, issued Nov. 28, 2023, which is a continuation of U.S. patent application Ser. No. 15/826,463 by Pandey et al., entitled "In-place Cloud Instance Restore," filed Nov. 29, 2017, now U.S. Pat. No. 11,372,729, issued Jun. 28, 2022; each of which are hereby incorporated in their entirety by reference herein.

This application is related to: U.S. patent application Ser. No. 17/721,240, filed Apr. 14, 2022, and U.S. patent application Ser. No. 16/890,879, filed Jun. 2, 2020; both of which are continuations of U.S. patent application Ser. No. 16/813,020, filed Mar. 9, 2020; which is a continuation of both U.S. patent application Ser. No. 16/270,586, filed Feb. 7, 2019, now U.S. Pat. No. 11,079,941, and U.S. patent application Ser. No. 15/804,382, filed Nov. 6, 2017, now U.S. Pat. No. 10,678,488; both of which are continuations of U.S. patent application Ser. No. 14/628,001, filed Feb. 20, 2015, now U.S. Pat. No. 10,241,691; which claims the benefit of priority to U.S. Provisional Application No. 62/075,112, filed Nov. 4, 2014.

This application is related to: Int'l Patent Application No. PCT/US2015/059063, filed Nov. 4, 2015; which claims priority to U.S. patent application Ser. No. 14/628,001, filed Feb. 20, 2015, now U.S. Pat. No. 10,241,691; U.S. patent application Ser. No. 14/628,010, filed on Feb. 20, 2015, now U.S. Pat. No. 10,114,564, U.S. patent application Ser. No. 14/628,019, filed on Feb. 20, 2015, now U.S. Pat. No. 10,114,564; U.S. patent application Ser. No. 14/628,022 filed on Feb. 20, 2015, now U.S. Pat. No. 9,569,124; U.S. patent application Ser. No. 14/628,024 filed on Feb. 20, 2015, now U.S. Pat. No. 10,282,112; U.S. patent application Ser. No. 14/628,028 filed on Feb. 20, 2015, now U.S. Pat. No. 9,715,346; U.S. patent application Ser. No. 14/628,031 filed on Feb. 20, 2015; U.S. patent application Ser. No. 14/628,033 filed on Feb. 20, 2015, now U.S. Pat. No. 10,114,565; U.S. patent application Ser. No. 14/628,041 filed on Feb. 20, 2015, now U.S. Pat. No. 10,007,445; all of which claims the benefit of priority to U.S. Provisional Application No. 62/075,112, filed Nov. 4, 2014.

This application is related to: U.S. patent application Ser. No. 17/734,890, filed May 2, 2022; which is a continuation of U.S. patent application Ser. No. 16/155,537, filed Oct. 9, 2018. This application is related to U.S. patent application Ser. No. 16/155,537, filed Oct. 9, 2018, and U.S. patent application Ser. No. 16/155,533, filed Oct. 9, 2018; both of which claims the benefit of priority to U.S. Provisional Application No. 62/570,436, filed Oct. 10, 2017.

FIELD OF THE TECHNOLOGY DISCLOSED

The technology disclosed generally relates to computer or digital data processing systems that include processes or apparatus for establishing original operating parameters or data for a computer or digital data processing system, such as, allocating extended or expanded memory, specifying device drivers, paths, files, buffers, disk management, instances of virtual machines; changing system settings or operational modes in a computer or digital data processing system after they have been set; increasing a system's extension of protection of system hardware, software, or data from maliciously caused destruction, unauthorized modification, or unauthorized disclosure; modifying or responding to the available power to a computer or digital data processing system or programmable calculator; synchronization of two or more processors; wherein there is a significant temporal, incremental or sequencing control provided to one or more computers, digital data processing systems, processors, memory, or peripherals, or to data transmission between these systems or components; and more particularly relates restoring corrupted virtual machines running on cloud servers.

BACKGROUND

A virtual machine is an emulation of a computer system that, like a physical computer, runs an operating system and applications. A virtual machine has virtual devices that provide the same functionality as physical hardware of a physical computer, and have additional benefits in terms of portability, manageability, and security. A computing service provider hosts one or more virtual machines. Virtual machines are usually backed up by the physical resources of their hosting computing service provider.

The computing service provider may be a local data center. A local data center is a facility consisting of networked computers and storages that organizations or other entities own and use to organize, process and store large amounts of data. The local data center is physically assessable to its owner.

The computing service provider may also be a cloud server. Some cloud servers may be owned and operated by third party providers and leased to the end user. Organizations and other entities can sign up as clients on one or more cloud servers. A cloud server enables ubiquitous, convenient, on-demand network access to a shared pool of configurable computing resources (e.g., networks, servers, storage, applications, and services) that can be rapidly provisioned and released with minimal management effort or service provider interaction. The cloud server can provide services to organizations or other entities as:

(i) Software as a Service (SaaS)—The clients run the cloud server's applications on the cloud server's computing resources. The applications are accessible from various devices through either a thin client interface, such as a web browser (e.g., web-based email), or a program interface. The client does not manage or control the underlying cloud computing infrastructure including network, servers, operating systems, storage, or even individual application capabilities, with the possible exception of limited user-specific application configuration settings.

(ii) Platform as a Service (PaaS)—The clients can deploy their own applications onto the cloud server's computing resources. The application can be acquired or created by the clients using programming languages, libraries, services, and tools supported by the cloud server. The client does not manage or control the underlying cloud server's computing resources including network, servers, operating systems, or storage, but has control over the deployed applications and possibly configuration settings for the application-hosting environment.

(iii) Infrastructure as a Service (IaaS)—The clients can provision processing, storage, networks, and other fundamental computing resources. The clients can deploy and run arbitrary software, which can include operating systems and applications on the provisioned resources. The client does not manage or control the underlying cloud computing infrastructure but has control over operating systems, storage, and deployed applications; and possibly limited control of select networking components (e.g., host firewalls).

Virtual machines running on local data centers or cloud servers have extensive data security requirements and typically need to be continuously available to deliver services to clients. For disaster recovery and avoidance, the computing service provider that provides virtual machine capability needs to avoid data corruption and service lapses to clients. Therefore, the computing service provider periodically takes snapshots of the running virtual machines. A snapshot is a copy of the virtual machine's content at a given point in time. Snapshots can be used to restore a virtual machine to a particular point in time when a failure or system error occurs. The computing service provider can take multiple snapshots of a virtual machine to create multiple possible point-in-time restore points. When a virtual machine reverts to a snapshot, current virtual machine's data volumes and memory states are deleted, and the snapshot becomes the new parent snapshot for that virtual machine.

Snapshots are intended to store the virtual machine data for as long as deemed necessary to make it feasible to go back in time and restore what was lost. As the main objective of snapshots is long-term data storage, various data reduction techniques are typically used by a snapshot manager in a computing service provider to reduce the snapshot size and fit the data into the smallest amount of disk space possible. This includes skipping unnecessary swap data, data compression, and data deduplication, which removes the duplicate blocks of data and replaces them with references to the existing ones. Because snapshots are compressed and duplicated to save storage space, they no longer look like virtual machines and are often stored in a special format. As snapshots just a set of files, the snapshot repository is a folder, which can be located anywhere: on a dedicated server, storage area network (SAN) or dedicated storage in a computing service provider's infrastructure.

Modern-day clients tend to run hybrid workloads where multiple virtual machines are running on a local data center and others on one or more cloud servers, which may be located remotely and/or may be leased from third party providers. An opportunity arises to keep a snapshot history, stored in sequence, and spanning multiple virtual machines on multiple cloud servers and local data centers at the clients' end. A further opportunity arises to configure scheduling of snapshot capture across multiple systems, potentially remoted and potentially leased from different third party cloud server providers. A further opportunity arises to provide improved disaster recovery for virtual machines executing on third party cloud servers in the event of data loss due to natural disasters, man-made disasters such as acts of terrorism, and/or virus attacks. A workload management system and a centralized workload management interface are needed to manage the backup and recovery for any running virtual machines, and browse and retrieve files in any of the running virtual machines across multiple cloud servers and the local data center.

SUMMARY

A system and a method are provided that can be used for restoring a virtual machine or an instance with an Internet Protocol address, a root volume and one or more corrupted data volumes. As used herein, no distinction is intended between a virtual machine and an instance. The corrupted virtual machine is hosted on a cloud server that hosts a plurality of virtual machines. The corrupted virtual machine is recovered by launching a recovery virtual machine in the cloud server. The recovery virtual machine is instructed to launch one or more new data volumes based upon captured file system images in one or more snapshots taken of corrupted data volumes of the virtual machine prior to becoming corrupted. The recovery virtual machine is further instructed to detach the corrupted data volumes, and attach the new data volumes launched to the virtual machine. The Internet Protocol address of the restored virtual machine remains unchanged.

Embodiments of the technology described herein, or elements thereof, can be implemented in the form of a computer product including a non-transitory computer-readable storage medium with the computer usable program code for performing the method steps indicated. Furthermore, embodiments of the invention or elements thereof can be implemented in the form of an apparatus including a memory and at least one processor that is coupled to the memory and operative to perform exemplary method steps. Yet further, in another aspect, embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

Thus, a technology is provided that enables clients running hybrid workloads with multiple virtual machines on local data centers and others on one or more cloud servers the capability to protect and manage their workloads in a platform-agnostic workload management system. The workload management system assigns protection policies for the virtual machines running on multiple cloud servers and local data centers, keeps snapshot histories of each of the running virtual machines, and provides the capability to search, restore and retrieve files in any of the running virtual machines.

Embodiments advantageously employ the disclosed technology implement a workload management system and centralized workload management interface to manage backup and recovery for any of a variety of virtual machines, and browse and retrieve files in any of the virtual machines across multiple cloud servers and the local data center; thereby improving functioning of a computer system enabling the computer system as improved to run hybrid workloads where multiple virtual machines are running on a local data center and others on one or more cloud servers, which may be located remotely and/or may be leased from third party providers. Specifically, embodiments provide heretofore unavailable abilities to keep a snapshot history, stored in sequence, and spanning multiple virtual machines on multiple cloud servers and local data centers at the clients' end irrespective of whether machines or servers are owned, leased, local or remote. Such capability results in a vast improvement in the ability of end users to manage their system without the expense, delay of accessing individual machines at different sites and operated by different people, making such widely distributed processing infrastructure available without requiring individually logins for each employee at each machine. Yet further, improved coverage of machine state of any machines in the infrastructure is provided by integrating snapshots of any machines together under a common workload management interface.

A further improvement in functionality of the computer system arises from the disclosed configuration of a scheduling mechanism for snapshot capture across multiple systems, potentially remoted and potentially leased from different third party cloud server providers. Improved quality of backups results from proper scheduling of snapshot taking across the multiple computer systems. Such pan-infrastructure management capability, heretofore unknown, improves the usability of the computer systems and ability to coordinate backup and other tasks among the various computer systems.

A yet further improvement in functionality of the computer system arises from the disclosed configuration of a common workload management interface that enables an operator to access the capabilities of any virtual machine, whether local, remote, owned or leased, in conjunction with viewing and accessing information for any other virtual machine in the infrastructure of the end user. Swap data that is unnecessary to capture in making a backup can be skipped. Operations can be controlled such as data compression and data deduplication, which removes the duplicate blocks of data and replaces them with references to the existing ones. Backup snapshots that no longer look like virtual machines are often stored in a special format, facilitating compression and deduplication that saves storage space.

A still further improvement in functionality of the computer system arises from centralized snapshot management techniques disclosed is improved disaster recovery for virtual machines or instances executing on third party cloud servers in the event of data loss due to natural disasters, man-made disasters such as acts of terrorism, and/or virus attacks. Specifically, the heretofore unavailable techniques disclosed for remotely deleting virtual volumes mounted to virtual machines that have become corrupted and replace such volumes with un-corrupted data from a captured snapshot history enables virtual machines that have been infected by viruses, natural disasters, or human carelessness or malfeasance to be recovered seamlessly, without the requirement of changing an Internet Protocol (IP) address of the virtual machine. Data corruptions can be avoided, avoid data, service lapses to clients can be reduced, damage incurred from non-preventable disasters can be remedies more quickly, and seamlessly than with heretofore known approaches.

These and other features, aspects, and advantages of the invention will become apparent from the following detailed description of illustrative embodiments thereof, which is to be read in connection with the accompanying drawings.

BRIEF DESCRIPTION OF THE DRAWINGS

FIG. 7 shows an example dialog box for customizing a virtual machine's service level agreements.

FIG. 13 illustrates an example UI screen for selecting a particular file inside a snapshot from a selected virtual machine for download.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown but is to be accorded the widest scope consistent with the principles and features disclosed herein.

System Overview

Figure 1:
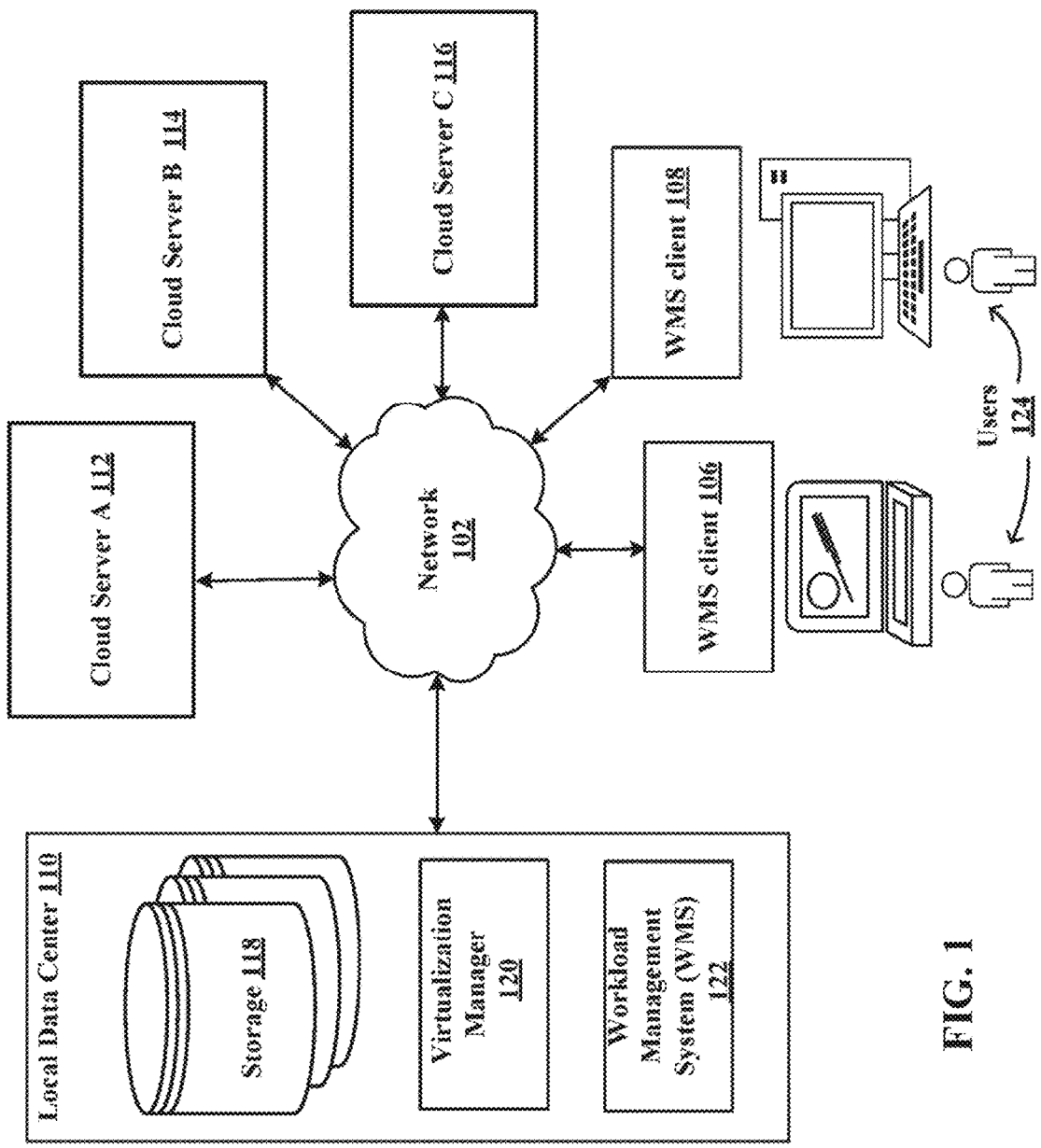
FIG. 1 illustrates an architectural level schematic of an example environment that includes a workload management system that identifies historical snapshots for virtual machines across cloud servers and local data centers, in accordance with an implementation.

FIG. 1 illustrates an architectural level schematic of an example environment that includes a workload management system (WMS) 122 that identifies historical snapshots for virtual machines across a plurality of cloud servers and local data centers, in accordance with an implementation. Because FIG. 1 is an architectural diagram, certain details are intentionally omitted to improve the clarity of the description. The discussion of FIG. 1 will be organized as follows. First, the elements of the figure will be described, followed by their interconnections.

The system 100 includes a cloud server A 112, a cloud server B 114, a cloud server C 116, workload management system clients (WMS clients) 106 and 108, a local data center 110 hosting a workload management system 122, and the network(s) 102. As used herein, a "WMS client" is a client interface application for the workload management system (WMS) 122. For the sake of clarity, only three cloud servers and two WMS clients are shown to be connected to the local data center 110 hosting the workload management system 122 through the network(s) 102. However, any number of cloud servers and WMS clients can be connected to the local data center 110 hosting the workload management system 122 through the network(s) 102. The interconnection of the elements of system 100 will now be described. Network(s) 102 couples the cloud server A 112, the cloud server B 114, the cloud server C 116, the WMS clients 106 and 108, the local data center 110, all in communication with each other (indicated by solid double-arrowed lines). In one embodiment, the workload management system 122 may be run using a dedicated hardware-based appliance inside the local data center 110.

The actual communication path through the internet can be point-to-point over public and/or private networks. The communications can occur over a variety of networks 102, e.g., private networks, VPN, MPLS circuit, or Internet, and can use appropriate application programming interfaces (APIs) and data interchange formats, e.g., Representational State Transfer (REST), JavaScript™ Object Notation (JSON), Extensible Markup Language (XML), Simple Object Access Protocol (SOAP), Java™ Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates and more, can be used to secure the communications.

The WMS clients 106 and 108 provide an interface for managing the workload management system 122 for administering services, including backup, instant recovery, replication, search, analytics, archival, compliance, and data management across the data local center 110 and cloud servers 112, 114, and 116. Users 124 running multiple virtual machines on the cloud server A 112, the cloud server B 114, the cloud server C 116, and the local data center 110 are connected to the workload management system 122 through WMS clients 106 and 108. Each client has an account in at least one of the cloud servers and the local data center. Examples of electronic devices which can deploy WMS clients 106 and 108 include all varieties of computers, workstations, laptop computers, handheld computers, and smartphones. The WMS clients 106 and 108 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond to a different version of the virtual machine (e.g., Version 1 of a virtual machine may correspond to the state of the virtual machine at a first point in time, and Version 2 of the virtual machine may correspond to the state of the virtual machine at a second point in time subsequent to the first point in time).

Cloud servers in environment 100 may comprise a cloud computing environment providing Software-as-a-Service (SaaS), Product-as-a-Service (SaaS) or Infrastructure-as-a-Service (IaaS) services. Examples of common cloud servers today include Amazon Web Services AWS™, Digital Ocean™, Microsoft Azure™, Rackspace Open Cloud™, Google Compute Engine™, HP Enterprise Converged Infrastructure™, IBM SmartCloud Enterprise™, IBM SmartCloud Enterprise™, CloudStack™, OpenStack™, Cisco Cloud Infrastructure Solutions™, CenturyLink Cloud™, Netrepid™, Green Cloud Technologies™, Amazon VPC™, CloudStack™, Linode™ and so on. In the technology described herein, cloud server A 112, cloud server B 114 and cloud server C 116 can use any of the platforms described.

In addition to the workload management system 122, the local data center 110 may include one or more virtualization managers, such as the virtualization manager 120, in communication with one or more storage devices, such as storage device 118. The one or more virtualization managers may also be in communication with the workload management system 122. The virtualization manager 120, storage device 118, and workload management system 122 may be in communication with each other via a networking fabric connecting servers and data storage units within the local data center to 110 each other. The workload management system 122 may include a workload management system for backing up virtual machines and/or files within a virtualized infrastructure. The virtualization manager 120 may be used to create and manage one or more virtual machines associated with a virtualized infrastructure. The one or more virtual machines may run various applications, such as a database application or a web server. The storage device 118 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a local data center, such as data center 110, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The virtualization manager 120 may manage a virtualized infrastructure inside the local data center 110 and perform management operations associated with the virtualized infrastructure. The virtualization manager 120 may manage the provisioning of virtual machines running within the virtualized infrastructure and provide an interface to computing devices interacting with the virtualized infrastructure in the local data center 110. In one example, the virtualization manager 120 may set a virtual machine into a frozen state in response to a snapshot request made via an application programming interface (API) by the workload management system 122. Setting the virtual machine into a frozen state may allow a point in time snapshot of the virtual machine to be stored or transferred. The virtualization manager 120 may then transfer the snapshot of the virtual machine to a snapshot storage in response to a request made by the workload management system 122. After the data associated with the point in time snapshot of the virtual machine has been transferred to the snapshot storage the virtual machine may be released from the frozen state (i.e., unfrozen). The virtualization manager 120 may perform various virtual machine related tasks, such as cloning virtual machines, creating new virtual machines, monitoring the state of virtual machines, moving virtual machines between physical hosts for load balancing purposes, and facilitating backups of virtual machines.

In the embodiment illustrated in FIG. 1, the workload management system 122 may include a workload management system for backing up virtual machines in the local data center 110. The WMS clients 106 and 108 assign protection policies for the virtual machines running for each of the cloud servers (cloud server A 112, cloud server B 114, and cloud server C 116) and the local data center 110 through the workload management system 122. The workload management system 122 may further include the capability to finding content in snapshots captured from virtual machines running on multiple cloud servers connected to the workload management system 122, include the snapshot content in a metadata file and forward the metadata file to the WMS clients 106 and 108. The metadata file may include the name of a file, a size of the file, file permissions associated with the file, when the file was last modified, and file mapping information associated with an identification of the location of the file stored within the virtual machine. The WMS clients 106 and 108 keeps snapshot metadata histories of each of the running virtual machines, provides the capability to search, restore and retrieve files in any of the running virtual machines through the snapshot metadata received from the workload management system 122. The WMS clients 106 and 108 may also request the workload management system 122 to restore any corrupted virtual machine in any of the cloud servers in communication with the workload management system 122.

Figure 2:
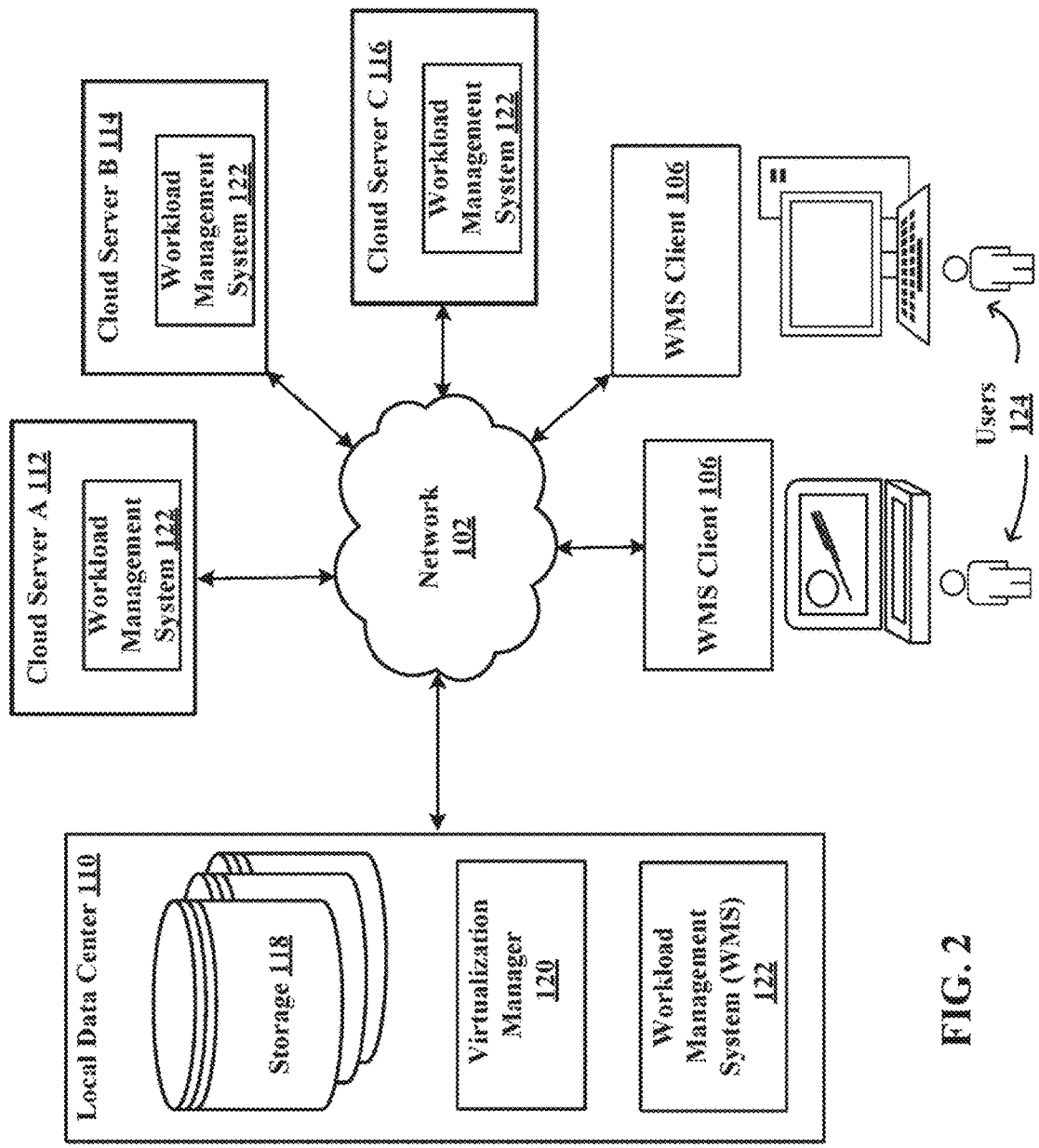
FIG. 2 illustrates an architectural level schematic of an example environment that includes multiple workload management systems that identify historical snapshots for virtual machines across cloud servers and local data centers, in accordance with an implementation.

FIG. 2 illustrates an architectural level schematic of an environment that includes multiple workload management systems that identify historical snapshots for virtual machines on multiple cloud servers and local data centers, in accordance with an implementation. In the embodiment illustrated in FIG. 2, the workload management system 122 may be run from the cloud server (e.g., the software-level components may be installed on a cloud server). In addition to the workload management system 122 being hosted in the local data center 110, each cloud server (cloud server A 112, cloud server B 114, and cloud server C 116) may include a workload management system 122. The WMS clients 106 and 108 assign protection policies for the virtual machines running for each of the cloud servers (cloud server A 112, cloud server B 114, and cloud server C 116) and the local data center 110 through the cloud server's respective workload management system. The workload management systems 122 may further include the capability to find content in snapshots captured from virtual machines running on their servers, include the snapshots content in a metadata file and forward the metadata file to the WMS clients 106 and 108. The metadata file may include the name of a file, a size of the file, file permissions associated with the file, when the file was last modified, and file mapping information associated with an identification of the location of the file stored within the virtual machine. The WMS clients 106 and 108 keeps snapshot metadata histories of each of the running virtual machines, provides the capability to search, restore and retrieve files in any of the running virtual machines through the snapshot metadata received from the workload management system 122. The WMS clients 106 and 108 may also request the workload management system 122 to restore any corrupted virtual machine in any of the cloud servers through the cloud server's workload management system.

In one embodiment, the networked computing environments 100 and 200 may include a virtualized infrastructure that provides software, data processing, and/or data storage services to users 124 accessing the services via the networked computing environment. In one example, networked computing environments 100 and 200 may provide cloud based work productivity or business related applications to computing devices. In some embodiments, networked computing environments 100 and 200 may provide remote access to secure applications and files stored within the local data center 110 and cloud servers 112, 114, and 116 from a remote computing device, such as the computing devices used by users 124.

Cloud Server

Figure 3:
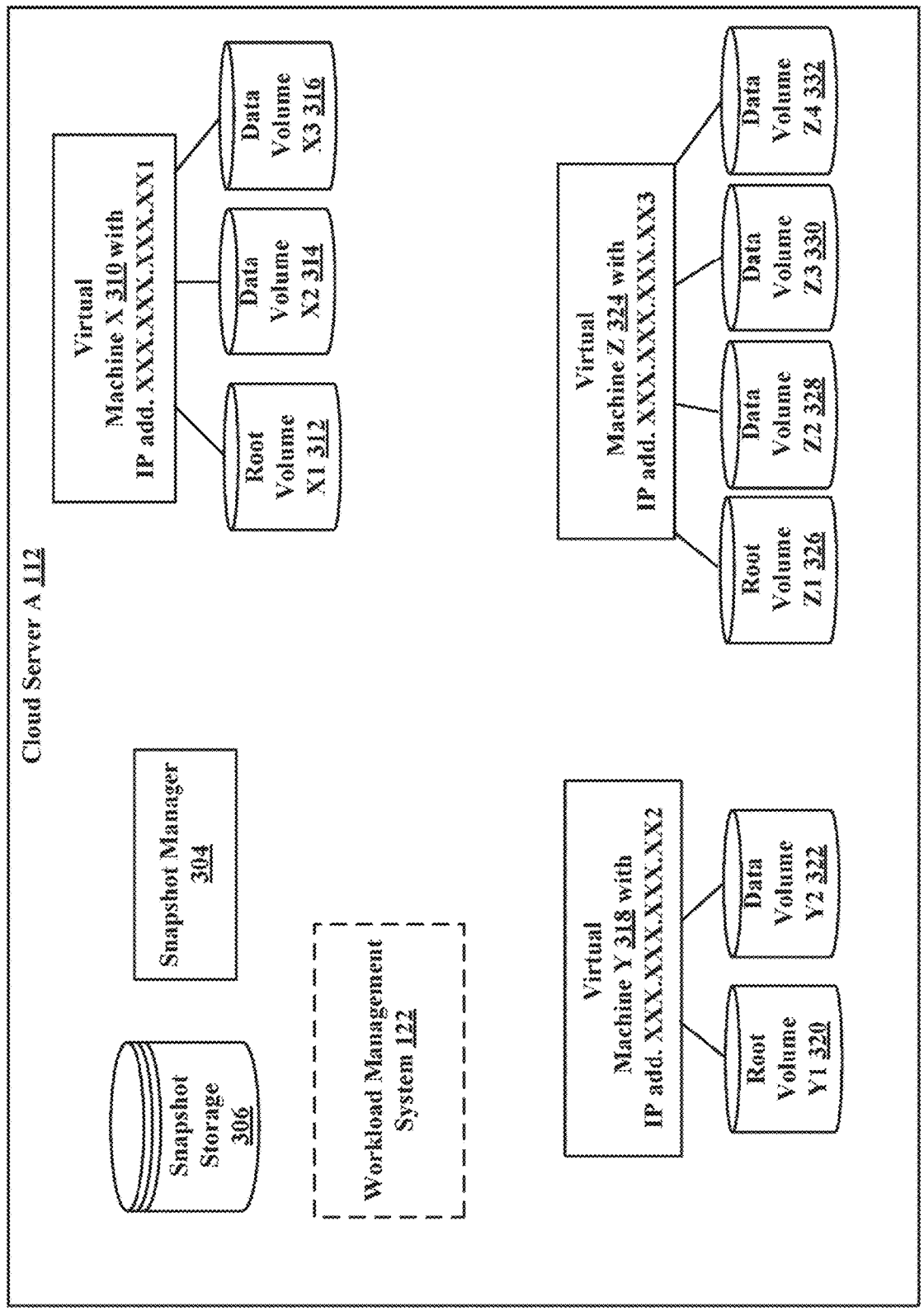
FIG. 3 illustrates an example of a cloud server.

FIG. 3 illustrates a symbolic drawing of a cloud server. A client with an account in a cloud server may run one or more virtual machines on the cloud server's platform. Each running virtual machine has its own Internet Protocol (IP) address. Each virtual machine has a root volume and one or more data volumes. A volume is defined as virtual storage in the virtual machine and is connected to the virtual machine. A root volume contains the operating system of the virtual machine. A root volume may be created when a virtual machine is initialized. When the virtual machine is deleted, the root volume is also deleted. A data volume is defined as the second or subsequent volume among those connected to a virtual machine. The data volume does not contain any part of the operating system of the virtual machine. A data volume can be attached or detached to a virtual machine. A data volume of a first virtual machine can be detached from the first virtual machine and attached to a second virtual machine.

Referring to FIG. 3, a user is running a virtual machine X 310 with IP address XXX.XXX.XXX.XX1, virtual machine Y 318 with IP address XXX.XXX.XXX.XX2, and virtual machine Z 324 with IP address XXX.XXX.XXX.XX3 in the cloud server A 112. The virtual machine X 310 with IP address XXX.XXX.XXX.XX1 has a root volume X1 312, a data volume X2 314 and a data volume X3 316. The virtual machine Y 318 with IP address XXX.XXX.XXX.XX2 has a root volume Y1 320, and a data volume Y2 322. The virtual machine Z 324 with IP address XXX.XXX.XXX.XX3 has a root volume Z1 326, a data volume Z2 328, a data volume Z3 330 and a data volume Z4 332.

The cloud server A 112 may further include a snapshot manager 304 and a snapshot storage 306. The snapshot manager 304 may follow a backup schedule to capture snapshots of a virtual machine at a particular point in time or one or more data volumes associated with the virtual machine at the particular point in time. In one example, the backup schedule is based on the service level agreements (SLA) that prevails between the workload management system 122 and the users 124. An SLA defines specific aspects of the service, including how often to take virtual machine snapshots and how long to keep the snapshots, as agreed between the workload management system 122 and the users 124.

The snapshots captured by the snapshot manager 304 can be stored in a dedicated storage, snapshot storage 306. The cloud server A 112 may also include a workload management system.

Figure 4:
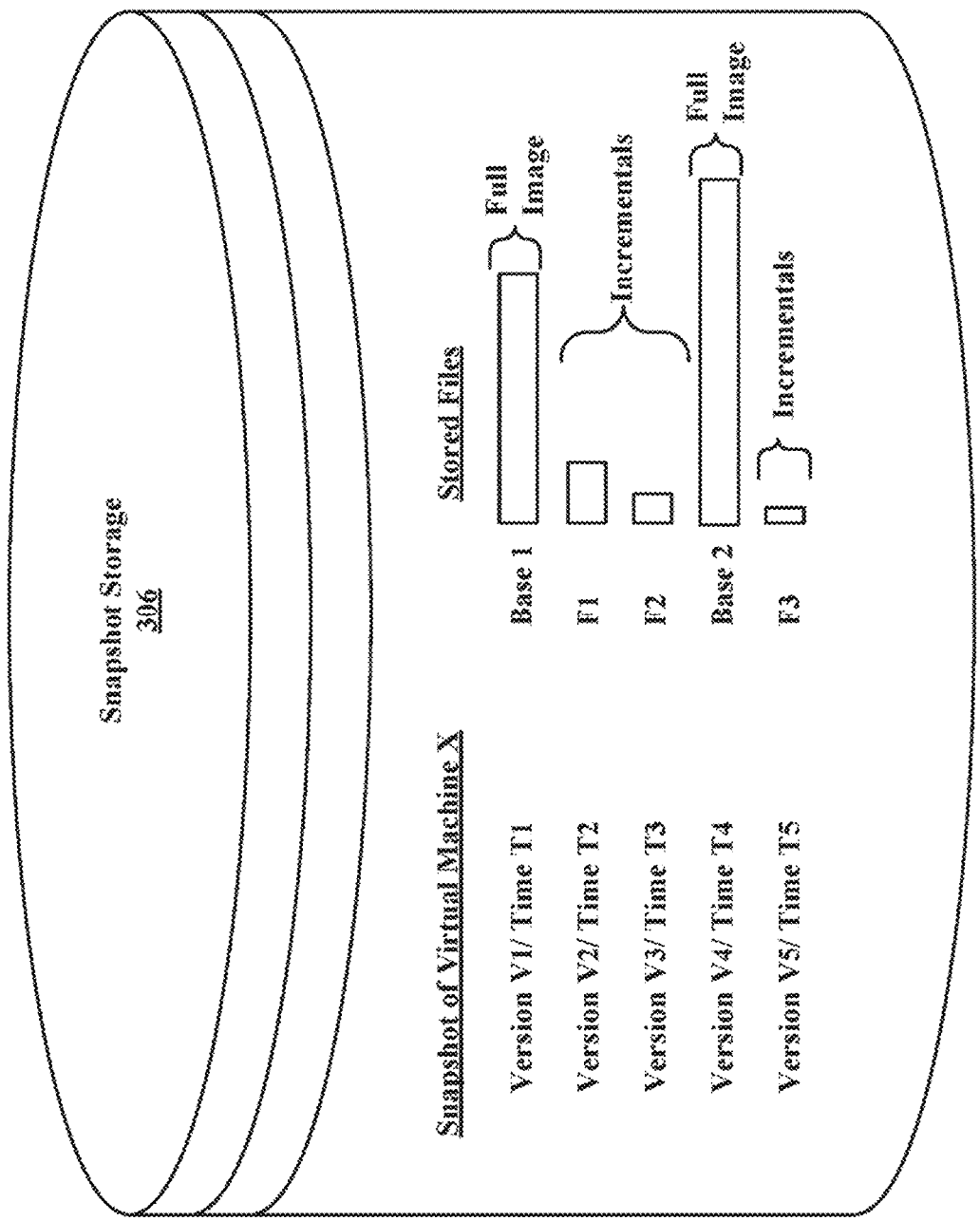
FIG. 4 is a symbolic drawing indicating how the snapshot storage database in FIG. 3 is organized.

FIG. 4 is a symbolic drawing indicating how the snapshot storage database 306 in FIG. 3 is organized, according to an embodiment of the invention. In some embodiments, a directory for each virtual machine protected using the snapshot manager 304 may be created (e.g., the directory for Virtual Machine X may be/snapshots_X). Snapshots and other data associated with a virtual machine may reside within the directory for the virtual machine. In one example, snapshots of a virtual machine may be stored in subdirectories of the directory (e.g., a first snapshot of Virtual Machine X may reside in/snapshots_X/s1/and a second snapshot of Virtual Machine X may reside in/snapshots_X/s2/).

In some embodiments, a plurality of versions of a virtual machine may be stored as a base file associated with a complete image of the virtual machine at a particular point in time (e.g., Version V1/Time T1 and Version V4/Time T4) and one or more incremental files (also referred to as "incrementals") (e.g., Version V2/Time T2; Version V3/Time T3; and Version V5/Time T5) associated with forward and/or reverse incremental changes derived from the base file. An incremental file may comprise a forward incremental file or a reverse incremental file. A forward incremental file may include a set of data representing changes that have occurred since an earlier point in time snapshot of a virtual machine. To generate a snapshot of the virtual machine corresponding to a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding to a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

In some embodiments, each version of the plurality of versions of a virtual machine may correspond to a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals, reverse incrementals, or a combination of both forward incrementals and reverse incrementals.

Referring to FIG. 4, a set of virtual machine snapshots stored for virtual machine X 310 includes a first set of files in the snapshot storage 306. As depicted, the first set of files includes a set a full image (Base 1) for snapshot V1 captured at time T1, and a set of forward incrementals (F1 for snapshot version V2 captured at time T2, F2 for snapshot version V3 captured at time T3). The first set of files also includes another full image (Base 2) for snapshot V4 captured at time T4, and a forward incremental (F3) for snapshot version V5 captured at time T5. In some cases, the file size of the forward incrementals may both be less than the file size of the base image. The base image corresponding to version V1 and V4 of virtual machine X may comprise full images of Virtual Machine X at a times T1 and T4 respectively. The base image may include the content of the data volume X2 314 and the data volume 316 of the Virtual Machine X 310 at times T1 and T4.

Workload Management System

Figure 5:
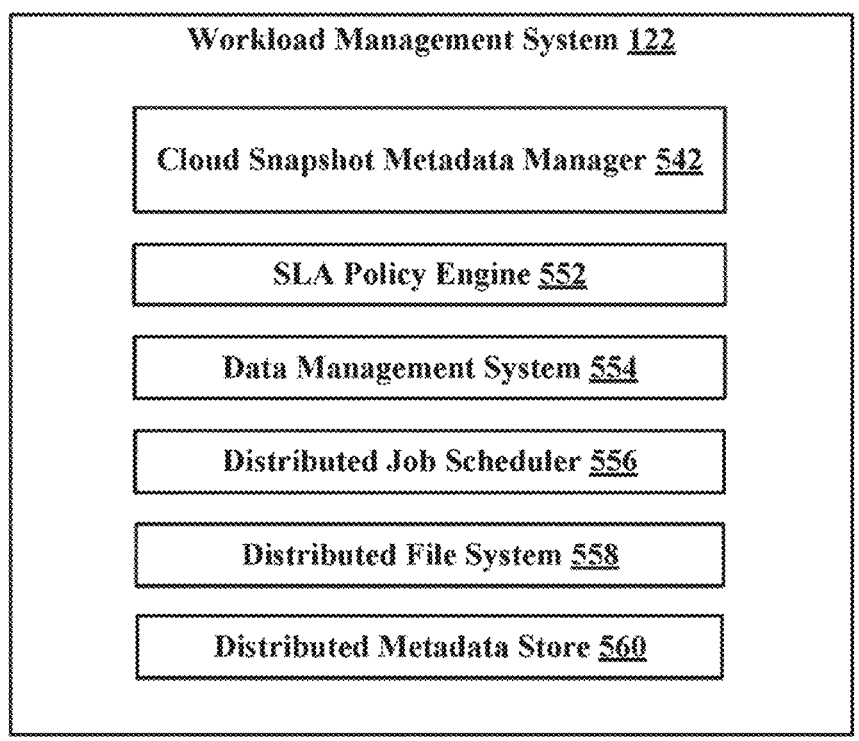
FIG. 5 illustrates an example of a workload management system, according to an embodiment of the invention.

FIG. 5 illustrates an example of a workload management system 122. In one embodiment, the workload management system 122 may manage the extraction and storage of virtual machine snapshots captured at different time points of one or more virtual machines running in the virtualization manager 120 within the local data center 110. In one embodiment, the workload management system 122 may manage the snapshot capturing schedule of one or more virtual machines running on one or more cloud servers. In one embodiment, the workload management system 122 may manage the extraction and storage of virtual machine snapshots captured at different time points of one or more virtual machines running in the virtualization manager 120 within the local data center 110 and the snapshot capturing schedule of one or more virtual machines running on one or more cloud servers. In response to a restore or recover command from a WMS client, the workload management system 122 may restore a point in time version of a virtual machine or restore point in time versions of one or more files located on the virtual machine.

Referring to FIG. 5, the workload management system 122 may have several software-level components. The software-level components of the workload management system 122 may include a cloud data manager 542, an SLA policy engine 552, a data management system 554, a distributed job scheduler 556, a distributed metadata store 560, and a distributed file system 558. In one embodiment, the software-level components of the workload management system 122 may be run using a dedicated hardware-based appliance with one or more processors and memory system. In another embodiment, the software-level components of the workload management system 122 may be run from the cloud (e.g., the software-level components may be installed on a cloud server's platform).

The SLA policy engine 552 includes intelligence to determine the snapshot capturing schedule to meet terms of service level agreements between the workload management system 122 and the users 124, with specific aspects of the service, including how often to take virtual machine snapshots and how long to keep the snapshots, as agreed between the workload management system 122 and the users 124.

The distributed file system 558 may present itself as a single file system in the workload management system 122 and is shared by one or more physical machines connected to the workload management system 122. Each file stored in the distributed file system 558 may be partitioned into one or more chunks. Each of the one or more chunks may be stored within the distributed file system 558 as a separate file. The files stored within the distributed file system 558 may be replicated or mirrored over a plurality of physical machines, thereby creating a load-balanced and fault-tolerant distributed file system. In one example, workload management system 122 may include ten physical machines and a first file corresponding with a snapshot of a virtual machine (e.g., /snapshots_A/s1/s1.full) may be replicated and stored on three of the ten machines.

The distributed metadata store 560 may include a distributed database management system that provides high availability without a single point of failure. In one embodiment, the distributed metadata store 560 may comprise a database, such as a distributed document-oriented database. The distributed metadata store 560 may be used as a distributed key-value storage system. In one example, the distributed metadata store 560 may comprise a distributed NoSQL key-value store database. In some cases, the distributed metadata store 560 may include a partitioned row store, in which rows are organized into tables or other collections of related data held within a structured format within the key-value store database. A table (or a set of tables) may be used to store metadata information associated with one or more files stored within the distributed file system 560. In one embodiment, a new file corresponding with a snapshot of a virtual machine may be stored within the distributed file system 558 and metadata associated with the new file may be stored within the distributed metadata store 560.

In some cases, the distributed metadata store 560 may be used to manage one or more versions of a virtual machine. Each version of the virtual machine may correspond with a full image snapshot of the virtual machine stored within the distributed file system 558 or an incremental snapshot of the virtual machine (e.g., a forward incremental or reverse incremental) stored within the distributed file system 558. In one embodiment, the one or more versions of the virtual machine may correspond to a plurality of files. The plurality of files may include a single full image snapshot of the virtual machine and one or more incrementals derived from the single full image snapshot. The single full image snapshot of the virtual machine may be stored using a first storage device of a first type (e.g., an HDD) and the one or more incrementals derived from the single full image snapshot may be stored using a second storage device of a second type (e.g., an SSD). In this case, only a single full image needs to be stored, and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 556 may be used for scheduling backup jobs that acquire and store virtual machine snapshots for one or more virtual machines in the local data centers and the cloud servers over time. The distributed job scheduler 556 may follow a backup schedule to backup an entire image of a virtual machine at a particular point in time or one or more data volumes associated with the virtual machine at the particular point in time. In one example, the backup schedule is the SLA agreement that prevails between the workload management system 122 and the users 124. Each of the one or more tasks associated with a job may be run on a particular processor of the workload management system 122.

The distributed job scheduler 556 may comprise a distributed fault tolerant job scheduler, in which jobs affected by processor failures are recovered and rescheduled to be run on available processors. The distributed job scheduler 556 may run job scheduling processes on each processor in a workload management system 122 or on a plurality of processors in the workload management system 122. In one example, the distributed job scheduler 556 may run a first set of job scheduling processes on a first processor in the workload management system 122, a second set of job scheduling processes on a second processor in the workload management system 122, and a third set of job scheduling processes on a third processor in the workload management system 122. The first set of job scheduling processes, the second set of job scheduling processes, and the third set of job scheduling processes may store information regarding jobs, schedules, and the states of jobs using a metadata store, such as distributed metadata store 560. In the event that the first processor running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 556 may undo and restart the failed jobs on available processors within the workload management system 122.

The cloud snapshot metadata manager 542 may have the capability to finding content in snapshots captured from virtual machines running on multiple cloud servers, compile a metadata file for the contents in the snapshots and forward the metadata file to the WMS clients 106 and 108. The cloud snapshot metadata manager 542 may request data associated with virtual blocks stored on a data volumes of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be compiled to make a metadata file. However, if the snapshot of the virtual machine is not the first snapshot taken of the virtual machine, then only the data blocks of the virtual machine that have changed since a prior snapshot was may be compiled to make a metadata file.

The data management system 554 may comprise an application running on the workload management system 122 that manages and stores one or more snapshots of a virtual machine in the local data center 110. In one example, the data management system 554 may comprise a highest level layer in an integrated software stack running on the workload management system 122. The integrated software stack may include the data management system 554, the distributed job scheduler 556, the distributed metadata store 560, and the distributed file system 558. In some cases, the integrated software stack may run on other computing devices, such as a server or computing device. The local workload management system 554 may use the distributed job scheduler 556, the distributed metadata store 560, and the distributed file system 558 to manage and store one or more snapshots of a virtual machine in the local data center 110. Each snapshot of the virtual machine may correspond to a point in time version of the virtual machine. The local workload management system 554 may generate and manage a list of versions for the virtual machine. Each version of the virtual machine may map to or reference one or more chunks and/or one or more files stored within the distributed file system 558. Combined together, the one or more chunks and/or the one or more files stored within the distributed file system 558 may comprise a full image of the version of the virtual machine.

Sign Up Process for Workload Management System

Figure 6:
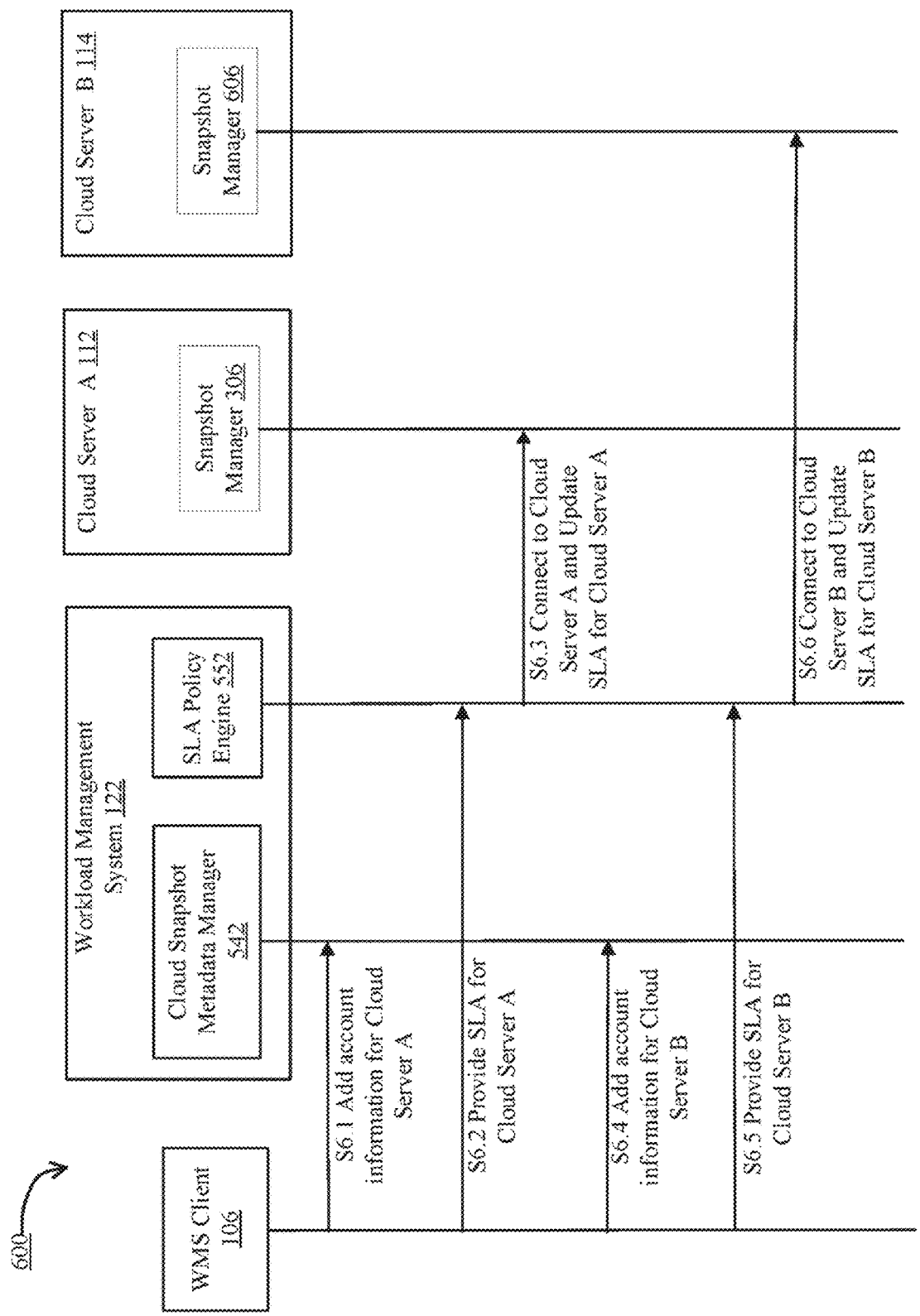
FIG. 6 is a sequence diagram illustrating a representative method of processing new accounts in cloud servers by the workload management system.

FIG. 6 is an example workflow 600 illustrating a representative method processing new accounts in cloud server A 112 and cloud server B 114 by the workload management system 122. In some embodiments, the actions in the workflow may be performed in different orders and with different, fewer or additional actions than those illustrated in FIG. 6. Multiple actions can be combined in some implementations.

FIG. 6 includes workflow 600 that begins at step S6.1 when a user requests through WMS client 106 to add account information for cloud server A 112. The account information provided by the user may include credentials required to access the account in the cloud server A 112.

Workflow 600 continues at step S6.2 when the user provides SLA information for the virtual machines the user is running on cloud server A 112 through the WMS client 106. The SLA is recorded in SLA policy engine 552 in the workload management system 122.

At step S6.3, the SLA policy engine 552 connects to snapshot manager 306 on cloud server A 112 to update the SLA for the virtual machines the user is running on the cloud server A 112.

At step S6.4, the user requests through the WMS client 106 to add account information for the cloud server B 114. The account information provided by the user may include credentials required to access the account in the cloud server B 114.

At step S6.5, the user provides SLA information for the virtual machines the user is running on cloud server B 114 through the WMS client 106. The SLA is recorded in SLA policy engine 552 in the workload management system 122.

At step S6.6, the SLA policy engine 552 connects to snapshot manager 606 on the cloud server B 114 to update the SLA for the virtual machines the user is running in the cloud server B 114.

FIG. 7 shows an example dialog box 700 for customizing a virtual machine's service level agreements within the user interface of the WMS client 106. The SLA includes specific aspects of the service, including how often to take virtual machine snapshots and how long to keep the snapshots, as agreed between the workload management system 122 and the user. In the example shown, a virtual machine snapshot is to be taken once every four hours 734, once every day 744, once every month 754 and once every year 764. The four-hour snapshots are to be kept for three days 748, the daily snapshots are to be retained for thirty days 758, the monthly snapshots are kept for one month 768, and the yearly snapshots are to be retained for two years 778. Note that the first full snapshot is to be taken at the first opportunity 774.

File Browsing and Searching

Figure 8:
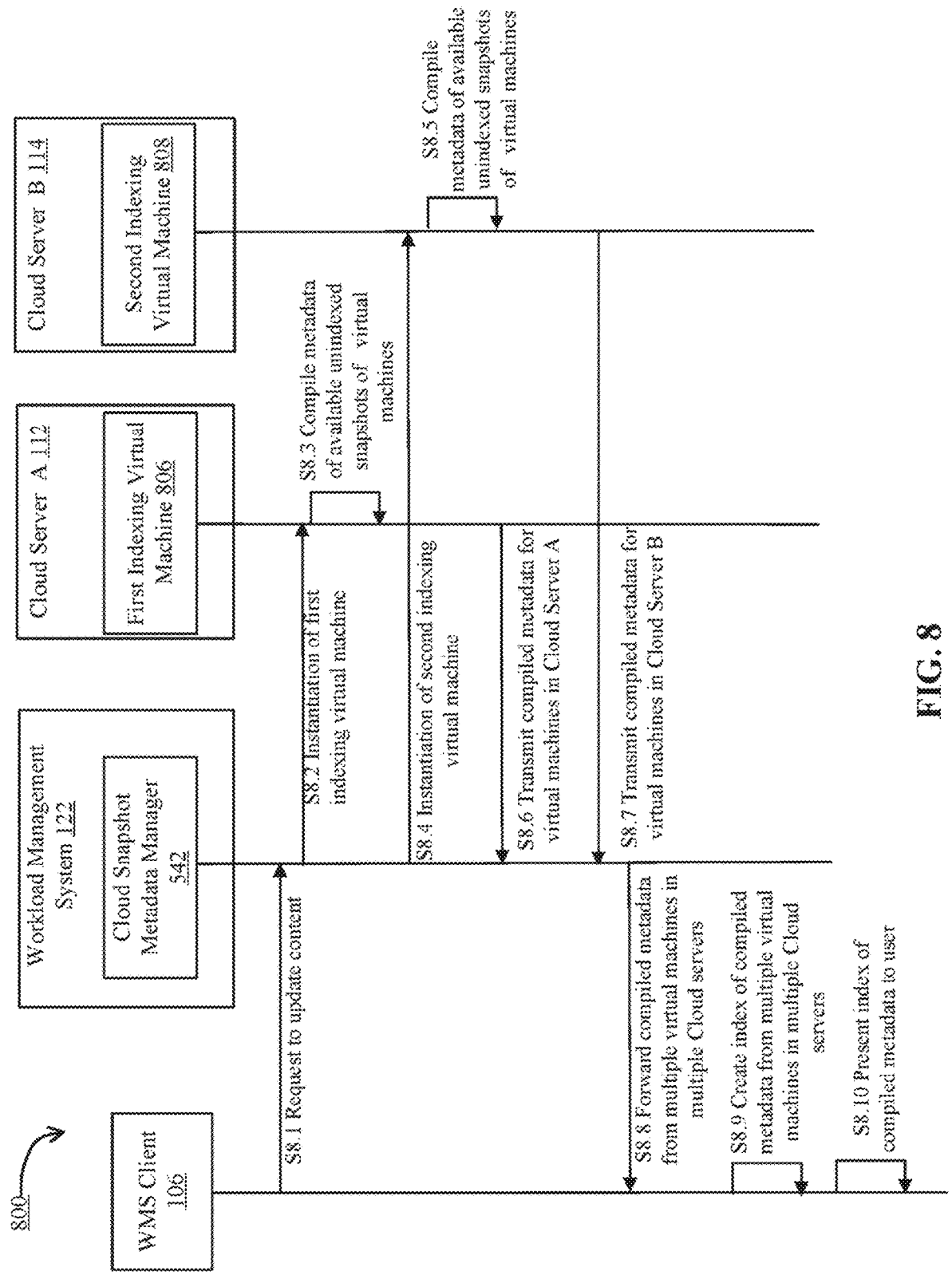
FIG. 8 is a sequence diagram illustrating a representative method of finding content among incremental snapshots in virtual machines on one or more cloud servers by the workload management system, according to an embodiment of the invention.

FIG. 8 is an example workflow 800 illustrating a representative method of finding content among incremental snapshots in virtual machines on cloud server A 112 and cloud server B 114 by the workload management system 122. In some embodiments, the actions in the workflow may be performed in different orders and with different, fewer or additional actions than those illustrated in FIG. 8. Multiple actions can be combined in some implementations.

FIG. 8 includes workflow 800 that begins at step S8.1, a user requests through the WMS client 106 to update content for all the virtual machines running on cloud server A 112 and cloud server B 114 to the cloud snapshot metadata manager 542 in the workload management system 122.

Workflow 800 continues at step S8.2 when the cloud snapshot metadata manager 542 instantiates a first indexing virtual machine 806 on the cloud server A 112.

At step S8.3, the first indexing virtual machine 806 compiles the metadata for available snapshots for virtual machines running on the cloud server A 112. As used herein, "available snapshots" may include any snapshots that have not been previously compiled by an indexing virtual machine to create a metadata file.

At step S8.4, the cloud snapshot metadata manager 542 instantiates a second indexing virtual machine 808 on the cloud server B 114.

At step S8.5, the second indexing virtual machine 808 compiles the metadata for available snapshots for the virtual machines running on the cloud server B 114.

At step S8.6, the first indexing virtual machine 806 transmits the compiled metadata for available snapshots for the virtual machines running on the cloud server A 112 to the cloud snapshot metadata manager 542.

At step S8.7, the second indexing virtual machine 808 transmits the compiled metadata for available snapshots for the virtual machines running on the cloud server B 114 to the cloud snapshot metadata manager 542.

At step S8.8, the cloud snapshot metadata manager 542 forwards the compiled metadata from the cloud server A 112 and the cloud server B 114 to the WMS client 106.

At step S8.9, the WMS client 106 creates an index for the compiled metadata from the cloud server A 112 and the cloud server B 114.

At step S8.10, the WMS client 106 presents the index of compiled metadata to the user.

For the sake of clarity, the workflow 800 illustrates the cloud snapshot metadata manager 542 accessing only two cloud servers. However, the cloud snapshot metadata manager 542 can access any number of cloud servers. In one embodiment, the first indexing virtual machine 806 and the second indexing virtual machine 808 may be shut down after transmitting the compiled metadata to the cloud snapshot metadata manager 542.

The index of compiled metadata may include a list of files that have been stored on a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the index of compiled metadata may be used to identify a version of the virtual machine that includes a particular version of a file (e.g., a particular version of a database, a spreadsheet, or a word processing document). In some cases, each of the virtual machines that are backed up or protected using workload management system 122 may have a corresponding virtual machine search index.

In some cases, if a virtual machine includes a plurality of data volumes, then a virtual machine metadata may be generated for each data volumes of the plurality of data volumes. For example, a first virtual machine search metadata may catalog and map files located on a first data volume of the plurality of data volumes and a second virtual machine search metadata may catalog and map files located on a second data volume of the plurality of data volumes. In this case, a global metadata for the virtual machine may include the first virtual machine search metadata and the second virtual machine search metadata.

In one embodiment, as each snapshot of a virtual machine is ingested, each data volume associated with the virtual machine is parsed in order to identify a file system type associated with the data volume and to extract metadata (e.g., file system metadata) for each file stored on the data volume. The metadata may include information for locating and retrieving each file from the data volume. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine metadata may be used to identify when the file was first created (e.g., corresponding to a first version of the file) and at what times the file was modified (e.g., corresponding to subsequent versions of the file). Each version of the file may be mapped to a particular version of the virtual machine that stores that version of the file.

Figure 9:
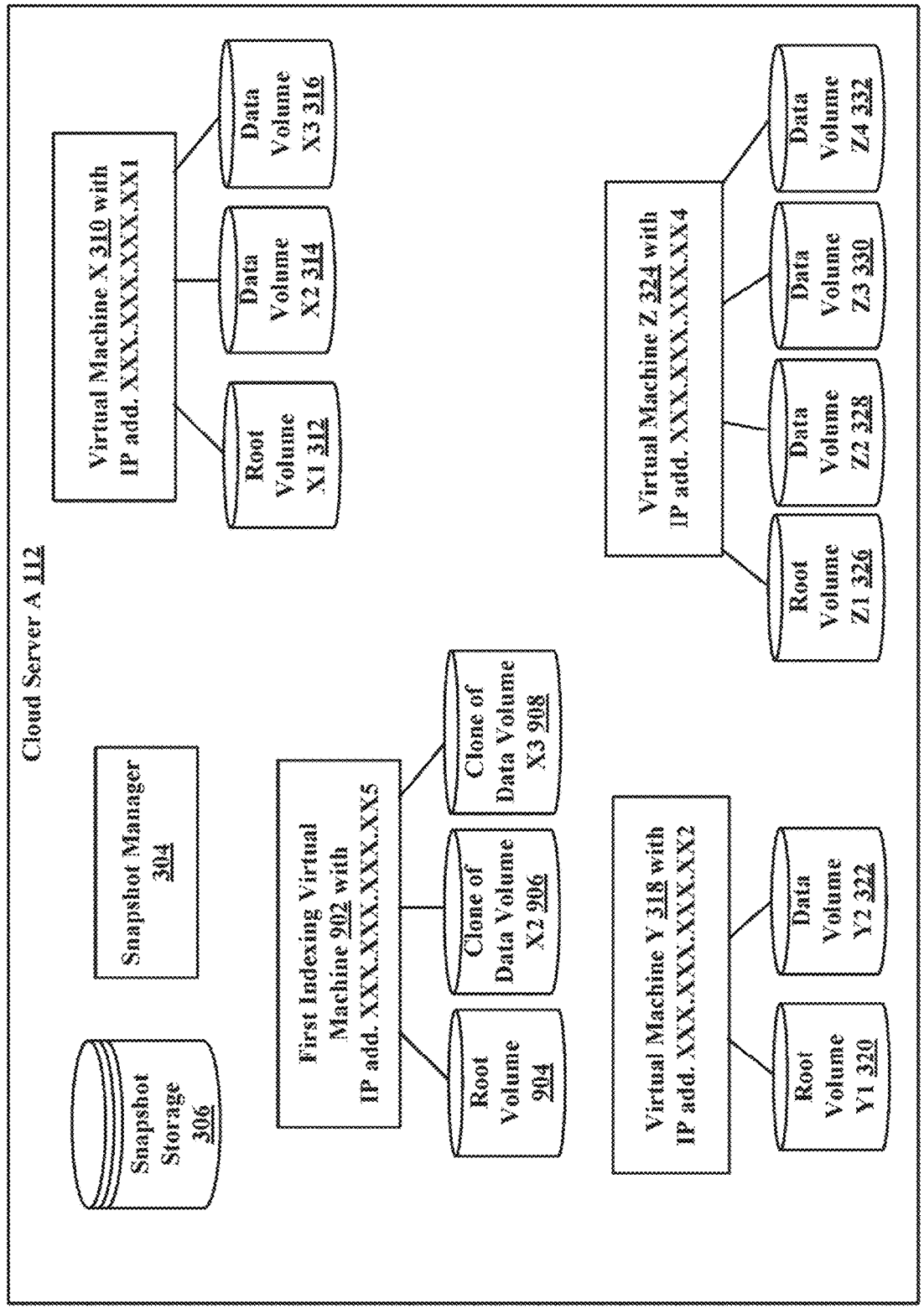
FIG. 9 illustrates an example of a first indexing virtual machine for finding content among incremental snapshots in virtual machines on a cloud server, according to an embodiment of the invention.

FIG. 9 illustrates an example of a first indexing virtual machine 902 instantiated by the cloud snapshot metadata manager 542 for finding content among incremental snapshots in virtual machines on the cloud server A 112. The first indexing virtual machine 902 with IP address XXX.XXX.XXX.XX5 has a root volume 904. The first indexing virtual machine 902 accesses the latest snapshot version for the virtual machine X 310 stored in the snapshot storage 306. As the virtual machine X 310 has the data volume X2 314 and the data volume X3 316, the latest version of the snapshot for virtual machine X 310 will have the content for both the data volume X2 314 and the data volume X3 316. In some embodiments, the last version of snapshot may be a forward incremental file that may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). In some embodiments, the last version of snapshot may be a reverse incremental file that may need be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file). In some embodiments, the latest version of the snapshot may be a full image.

The last set of virtual machine snapshots stored for virtual machine X 310 in the snapshot storage 306 is the forward incremental (F3) for snapshot version V5 captured at time T5. The forward incremental (F3) needs to be combined with the full image (Base 2) for snapshot V4 captured at time T4. The combined snapshot is loaded into the two data volumes of the first indexing virtual machine 902. The data volume X2 906 of the first indexing virtual machine 902 will be a clone of data volume X2 314 of the virtual machine X 310. The data volume X3 908 of the first indexing virtual machine 902 will be a clone of data volume X3 316 of the virtual machine X 310. The first indexing virtual machine 902 will compile a metadata for the content of the virtual machine X 310 by indexing the contents in the data volume X2 906 and the data volume X3 908 of the first indexing virtual machine 902. The indexing may be performed by an indexing application present in the first indexing virtual machine 902. After the metadata is compiled, it is transmitted to the cloud snapshot metadata manager 542. The cloud snapshot metadata manager 542 forwards the compiled metadata for the virtual machine X 310 from the cloud server A 112 to the WMS client 106. The WMS client 106 creates an index for the compiled metadata from the cloud server A 112 and presents the index of compiled metadata to the client. In one embodiment, generating an index can include building a tree like data structure from discovered file metadata. Further detailed description of generating an index, reference may be had to a commonly owned U.S. Nonprovisional patent application Ser. No. 14/628,019 entitled "Converged Search and Archival System," by Arvind Jain et al., filed Feb. 20, 2015, which is incorporated by reference herein. Other types and formats of indexes may be built in various embodiments without departing from the scope of the presently disclosed technology.

Figure 10:
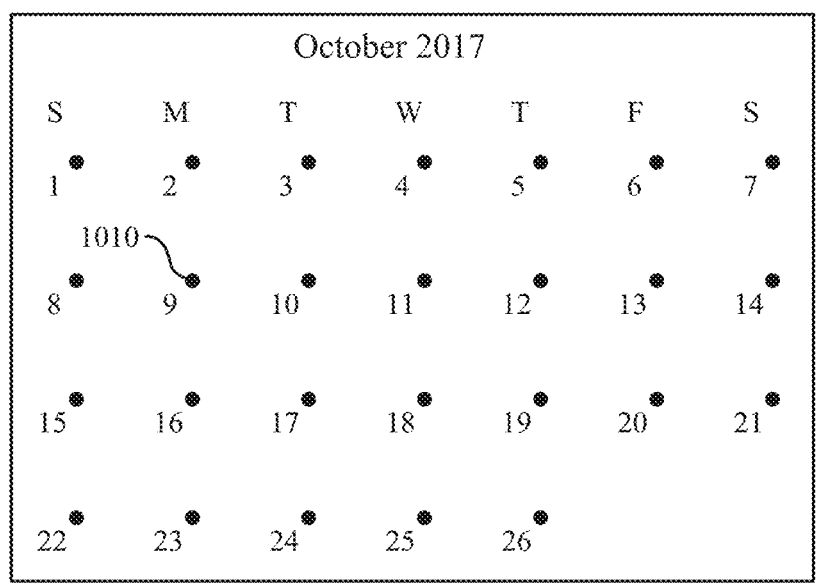
FIG. 10 illustrates an example UI screen for viewing the snapshots for a selected virtual machine, by calendar month.
Figure 11:
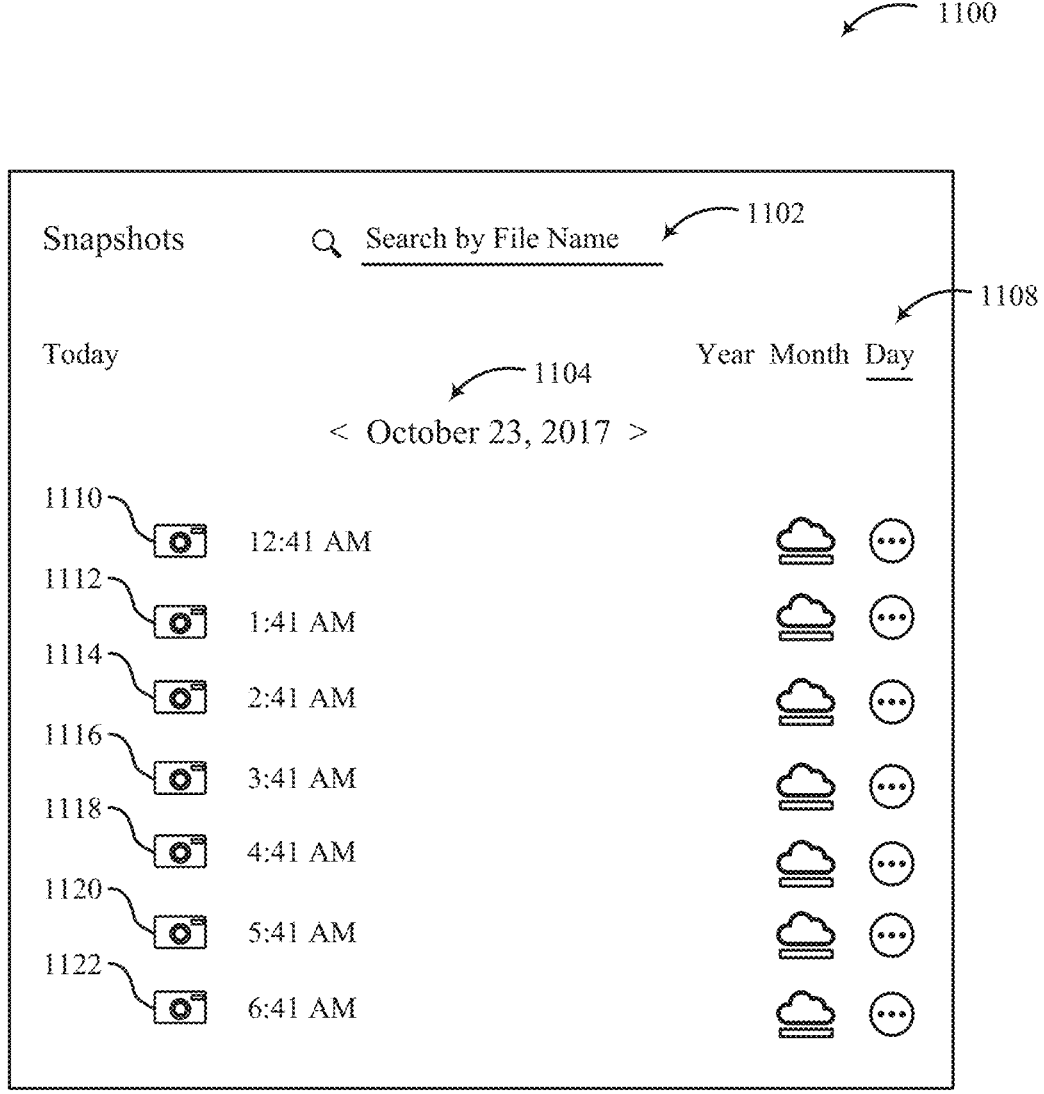
FIG. 11 illustrates an example UI screen for viewing the snapshots for a selected virtual machine, by calendar day.
Figure 12:
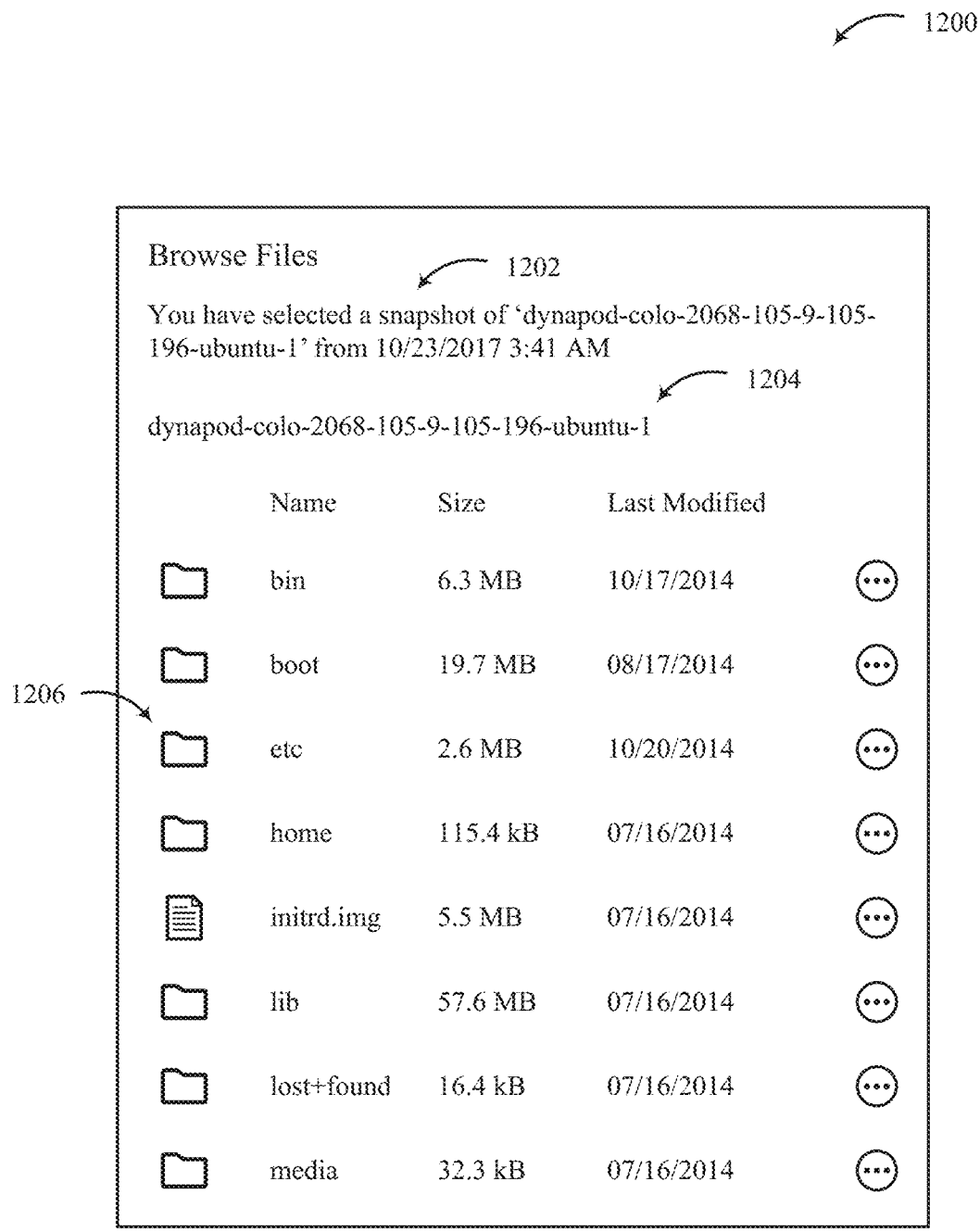
FIG. 12 illustrates an example UI screen for viewing the files inside a snapshot for a selected virtual machine.

FIG. 10 illustrates an example UI screen 1000 of the WMS client 106 for viewing the snapshots for a selected virtual machine, by calendar month 1002, with a dot on every date 1010 that has a stored snapshot. FIG. 11 illustrates an example UI screen 1100 of the WMS client 106 for viewing the snapshots for a selected virtual machine, by calendar day 1108. Contents of snapshots captured on Oct. 23, 2017 1104 at 12:41 AM 1110, 1:41 AM 1112, 2:41 AM 1114, 3:41 AM 1116, 4:41 AM 1118, 5:41 AM 1120 and 6:41 AM 1122 can be selected from UI screen 1100. A file can also be searched by name 1102. FIG. 12 illustrates an example UI screen 1200 for viewing the content 1206 inside a selected snapshot 1202 for a selected virtual machine 1204.

File Restore and Retrieval

The WMS client 106 may also receive an instruction from a user to restore a particular version of a particular file (e.g., a word processing document or a database file), determine a second version from the plurality of time versions of the virtual machine that includes the particular version of the particular file, extract the particular version of the particular file from a portion of the second version of the virtual machine (e.g., extracting the particular version of the particular file without completely generating the full image of the second version of the virtual machine), and output the particular version of the particular file (e.g., by transferring the particular version of the particular file to a server). In some cases, a group of one or more files (e.g., associated with a file folder) may be restored without requiring a full image of a virtual machine to be generated or restored.

The WMS client 106 may also receive an instruction from the client to select a particular version of a file to be retrieved from a selected virtual machine. FIG. 13 illustrates an example UI screen 1300 for selecting a particular file 1302 inside a snapshot for a selected virtual machine for download.

Figure 14:
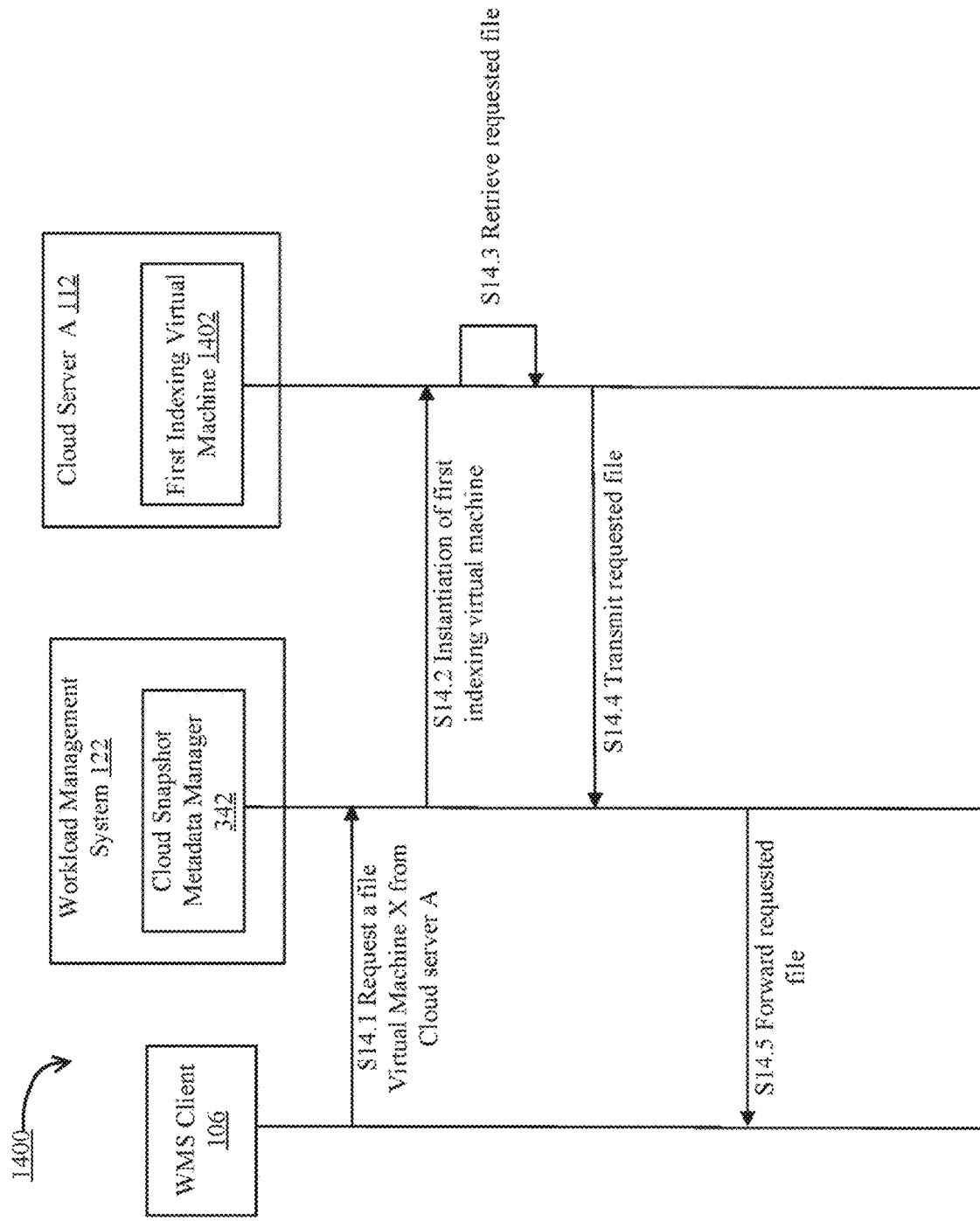
FIG. 14 is a sequence diagram illustrating a representative method of retrieving a selected file from virtual machines on a cloud server by the workload management system, according to an embodiment of the invention.

FIG. 14 is an example workflow 1400 illustrating a representative method of retrieving a selected file in virtual machines on cloud server A 112 by the workload management system 122 in FIG. 3. In some embodiments, the actions in the workflow may be performed in different orders and with different, fewer or additional actions than those illustrated in FIG. 14. Multiple actions can be combined in some implementations.

FIG. 14 includes workflow 1400 that begins at step S14.1 when a user requests through the WMS client 106 to retrieve a file from a selected snapshot of virtual machine X 310 on the cloud server A 112. The request is sent to the cloud snapshot metadata manager 342 in the workload management system 122.

Workflow 1400 continues at step S14.2 when the cloud snapshot metadata manager 542 instantiates a first indexing virtual machine 1402 on the cloud server A 112.

At step S14.3, the first indexing virtual machine 1402 retrieves the requested file. The file retrieval may be done by the first indexing virtual machine 1402 mounting the selected snapshot of virtual machine X 310 and accessing the file after the selected snapshot has been mounted to first indexing virtual machine's data volumes.

At step S14.4, the first indexing virtual machine 1402 transmits the requested file to the cloud snapshot metadata manager 542 in the workload management system 122.

At step S14.5, the cloud snapshot metadata manager 542 forwards the requested file to the WMS client 106.

In-Place Virtual Machine Restore

In-place virtual machine or instance restore refers to the process where a virtual machine needs to be terminated, and a new virtual machine launched from the old virtual machine's snapshots would replace the old virtual machine. A virtual machine may need to be terminated when it becomes corrupted. A virtual machine may become corrupted for one or more of the following reasons: damage in the root volume, damage in one or more data volumes, the virtual machine was improperly shut down and so on. In one embodiment, the new virtual machine launched in the place of the old virtual machine may have the same IP address as the old virtual machine.

In one embodiment, the snapshot storage 306 may manage and store a plurality of point in time versions of a virtual machine. The WMS client 106 receives an instruction from a user to restore a certain virtual machine by mounting a particular version of a snapshot in the selected virtual machine. In one embodiment, the workload management system 122 may restore only the corrupted data volumes while leaving the uncorrupted data volumes intact. In one embodiment, the workload management system 122 may restore all the data volumes, including the corrupted data volumes and the uncorrupted data volumes. In one embodiment, the cloud server hosting the virtual machine with corrupted data volumes may acknowledge the restoring process of one or more data volumes of the virtual machine.

Figure 15:
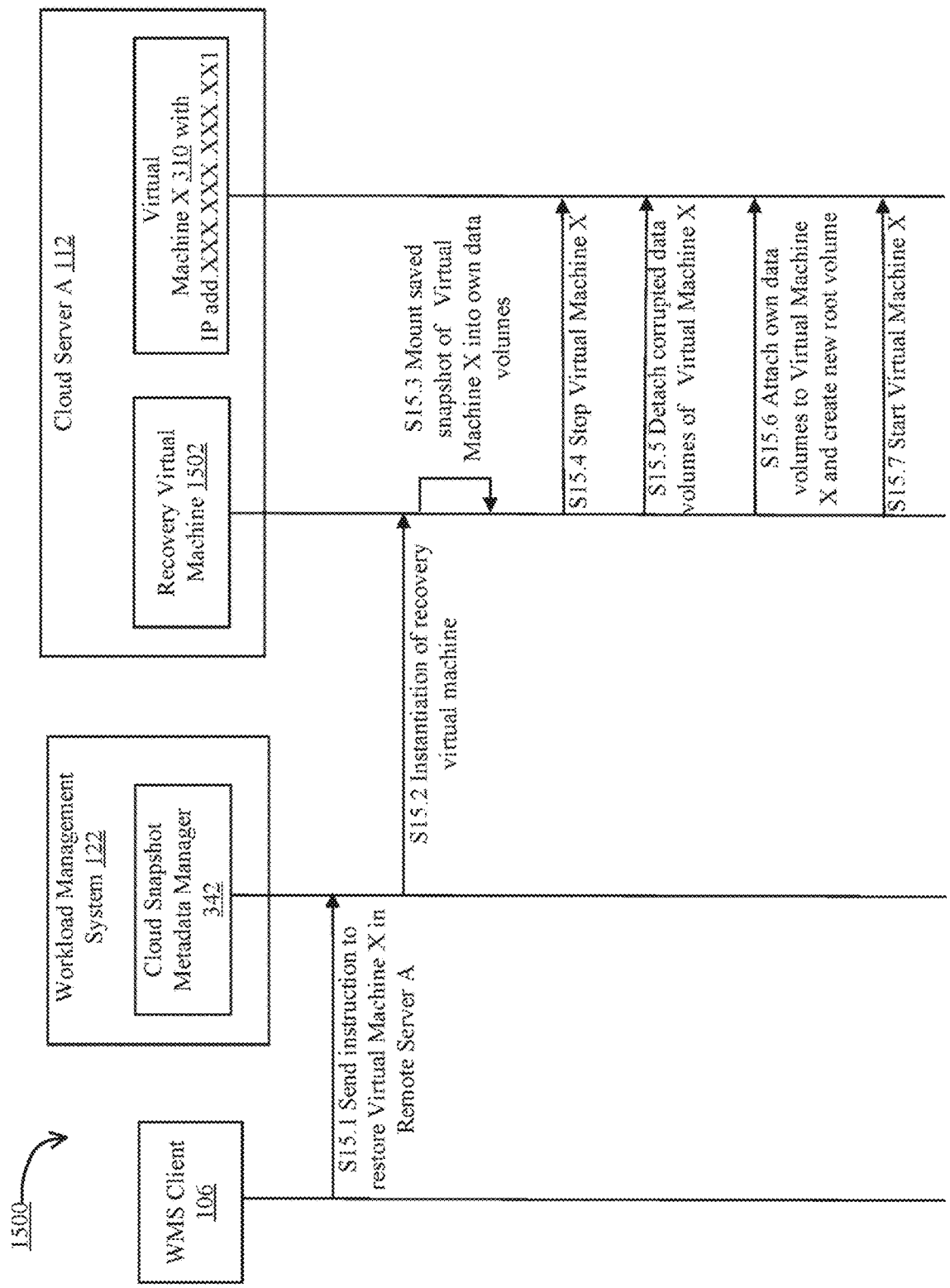
FIG. 15 is a sequence diagram illustrating a representative method of restoring a corrupted virtual machine on a cloud server by the workload management system, according to an embodiment of the invention.

FIG. 15 is an example workflow 1500 illustrating a representative method of restoring a virtual machine on the cloud server A 112 by the workload management system 122. In some embodiments, the actions in the workflow may be performed in different orders and with different, fewer or additional actions than those illustrated in FIG. 15. Multiple actions can be combined in some implementations.

FIG. 15 includes workflow 1500 that begins at step S15.1 when a client requests through the WMS client 106 to restore the virtual machine X 310 on the cloud server A 112. The request is sent to the cloud snapshot metadata manager 542 in the workload management system 122.

Workflow 1500 continues at step S15.2 when the cloud snapshot metadata manager 342 instantiates a recovery virtual machine 1502 on the cloud server A 112.

At step S15.3, the recovery virtual machine 1502 mounts a snapshot of the virtual machine X 310 into its own data volumes. In one embodiment, the mounted snapshot may be selected by the user. In another embodiment, the mounted snapshot may be the last saved snapshot. In one embodiment, the mounted snapshot may contain data for the corrupted data volumes. In another embodiment, the mounted snapshot may contain data for all the data volumes.

At step S15.4, the recovery virtual machine 1502 shuts down the virtual machine X 310.

At step S15.5, the recovery virtual machine 1502 detaches the damaged data volumes from the virtual machine X 310. In one embodiment, the recovery virtual machine 1502 may detach one or more corrupted data volumes, while keeping the uncorrupted volumes intact. In another embodiment, the recovery virtual machine 1502 may detach all the data volumes.

At step S15.6, the recovery virtual machine 1502 detaches its own data volumes and attaches the detached data volumes to the virtual machine X 310. In one embodiment, the recovery virtual machine 1502 may also create a new root volume for the virtual machine X 310. In one embodiment, a root volume is created from an operating system image. In another embodiment, a root volume is created by mounting a snapshot containing an image of a previous version a root volume of the virtual machine X 310. In one embodiment, data volumes which were mounted from snapshots are restored, while rest of the data volumes of the virtual machine remain intact. In one embodiment, both the corrupted data volumes and the uncorrupted data volumes are restored.

At step S15.7, the recovery virtual machine 1502 starts the virtual machine X 310 with restored data volumes and root volume.

Figure 16A:
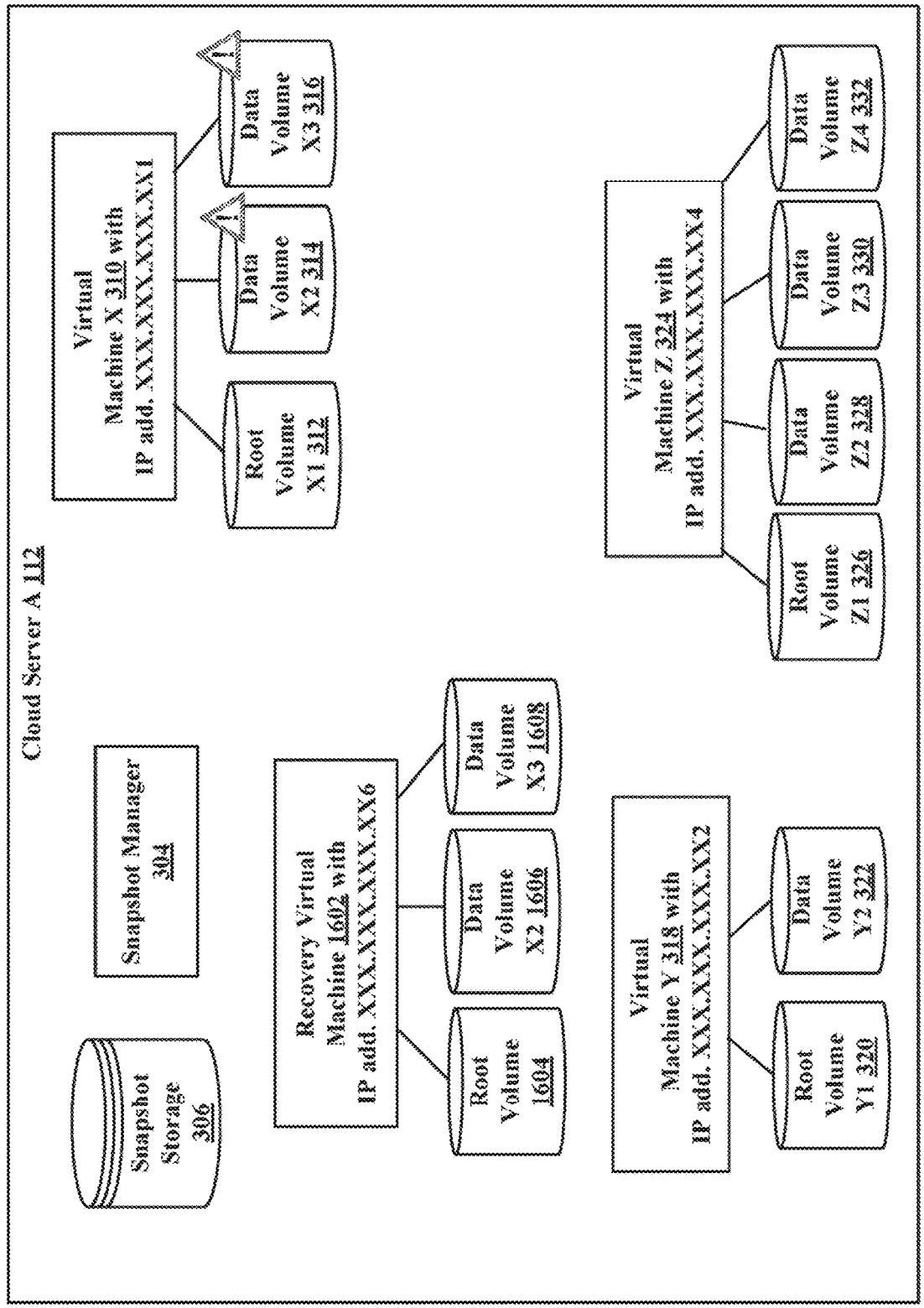
FIGS. 16A, 16B, and 16C (hereafter FIG. 16) illustrate a recovery virtual machine restoring a corrupted virtual machine.

FIG. 16A illustrates an example of a recovery virtual machine 1602 instantiated by the cloud snapshot metadata manager 542 for restoring the virtual machine X 310 on the cloud server A 112. The data volume X2 314 and the data volume X3 316 of the virtual machine X 310 are corrupted. The recovery virtual machine 1602 with IP address XXX.XXX.XXX.XX6 has a root volume 1604. In one embodiment, the user may select a snapshot to be mounted to the virtual machine X 310. In another embodiment, the recovery virtual machine 1602 accesses the latest snapshot version for virtual machine X 310 stored in the snapshot storage 306. In some embodiments, the last version of snapshot may be a forward incremental file that may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). In some embodiments, the last version of snapshot may be a reverse incremental file that may need be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file). In some embodiments, the latest version of the snapshot may be a full image.

Referring to FIG. 4, the last set of virtual machine snapshots stored for the virtual machine X 310 in the snapshot storage 306 is a full image (Base 2) for snapshot V4 captured at time T4, and a forward incremental (F3) for snapshot version V5 captured at time T5. The forward incremental F3 is combined with the full image, and the combined snapshot is loaded into the two data volumes of the recovery virtual machine 1602.

Figure 16B:
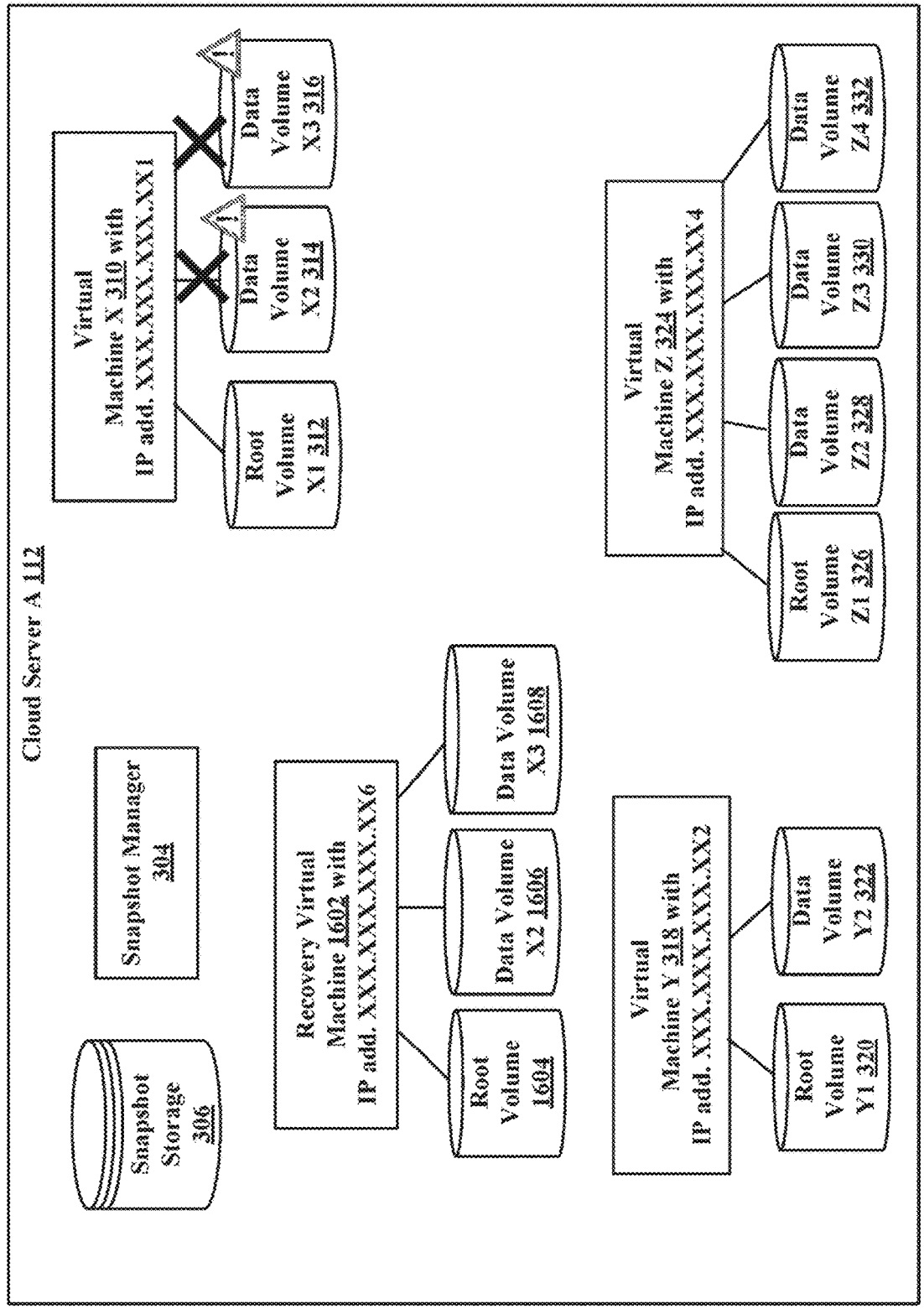
Figure 16C:
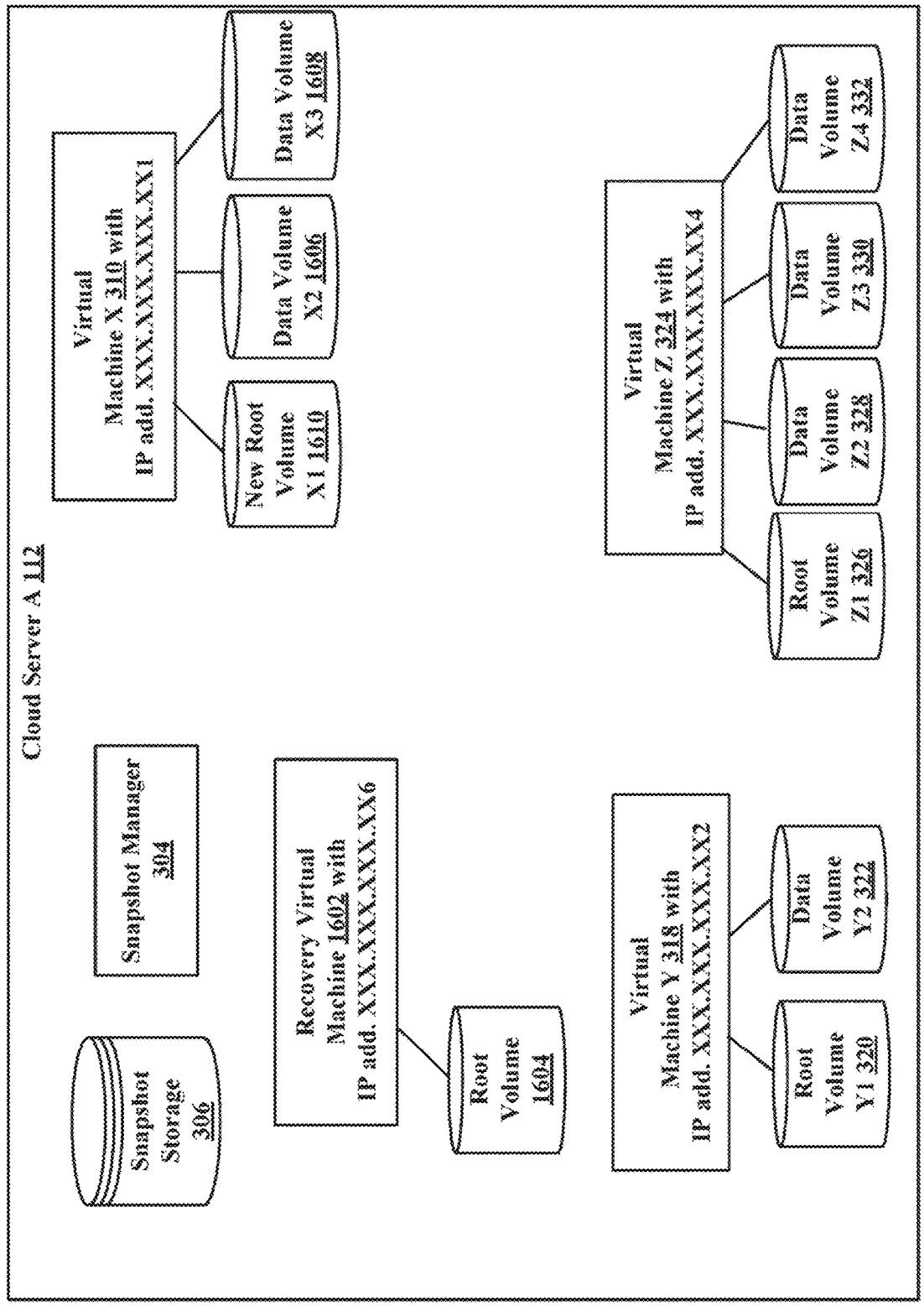

FIG. 16B illustrates the recovery virtual machine 1602 detaching the damaged data volume X2 314 and data volume X3 316 from the virtual machine X 310. FIG. 16C illustrates the recovery virtual machine 1602 restoring the virtual machine X 310 by detaching its own data volumes, data volume X2 1606 and data volume X3 1608, and attaching the detached data volumes to the virtual machine X 310. The recovery virtual machine 1602 may also create a new root volume X1 1610 for the virtual machine X 310.

Computer System

Figure 17:
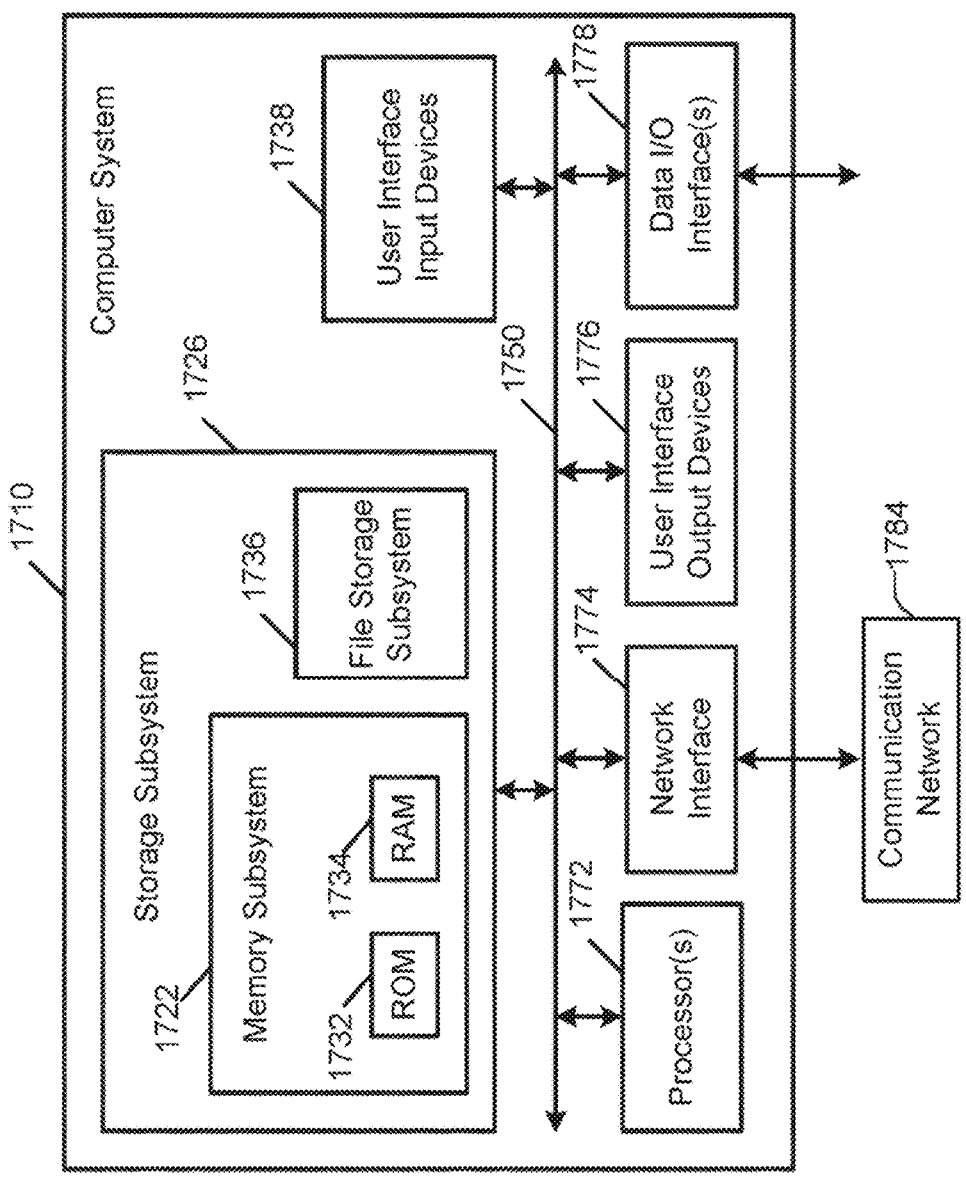
FIG. 17 is an example block diagram of a computing system that may incorporate embodiments of the present invention.

FIG. 17 is an example block diagram of a computing system that may incorporate embodiments of the present invention. System 1700 can be implemented using a computer program stored in system memory, or stored on other memory and distributed as an article of manufacture, separately from the computer system. Particularly it can be used to implement the workload management system 122 in various embodiments.

Computer system 1710 typically includes a processor subsystem 1772 which communicates with a number of peripheral devices via bus subsystem 1750. These peripheral devices may include a storage subsystem 1726, comprising a memory subsystem 1722 and a file storage subsystem 1736, user interface input devices 1738, user interface output devices 1778, and a network interface subsystem 1776. The input and output devices allow user interaction with computer system 1710 and network and channel emulators. Network interface subsystem 1774 provides an interface to outside networks and devices of the system 1700. The computer system further includes communication network 1784 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

User interface input devices 1738 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1710.

User interface output devices 1778 may include a display subsystem, a printer, a fax machine, or non-visual displays such as audio output devices. The display subsystem may include a flat panel device such as a liquid crystal display (LCD) or LED device, a projection device, a cathode ray tube (CRT) or some other mechanism for creating a visible image. The display subsystem may also provide a nonvisual display such as via audio output devices. In general, use of the term "output device" is intended to include all possible types of devices and ways to output information from computer system 1710 to the user or to another machine or computer system. The computer system further can include user interface output devices 1778 for communication with user equipment.

Storage subsystem 1726 stores the basic programming and data constructs that provide the functionality of certain embodiments of the present invention. For example, the various modules implementing the functionality of certain embodiments of the invention may be stored in a storage subsystem 1726. These software modules are generally executed by processor subsystem 1772.

Storage subsystem 1726 typically includes a number of memories including a main random access memory (RAM) 1734 for storage of instructions and data during program execution and a read-only memory (ROM) 1732 in which fixed instructions are stored. File storage subsystem 1736 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer-readable medium such as one or more CD-ROMs, and may be stored by file storage subsystem 1736. The host memory storage subsystem 1726 contains, among other things, computer instructions which, when executed by the processor subsystem 1772, cause the computer system to operate or perform functions as described herein. As used herein, processes and software that are said to run in or on "the host" or "the computer," execute on the processor subsystem 1772 in response to computer instructions and data in the host memory storage subsystem 1726 including any other local or remote storage for such instructions and data.

Bus subsystem 1750 provides a mechanism for letting the various components and subsystems of computer system 1710 communicate with each other as intended. Although bus subsystem 1750 is shown schematically as a single bus, alternative embodiments of the bus subsystem may use multiple busses.

Computer system 1710 itself can be of varying types including a personal computer, a portable computer, a workstation, a computer terminal, a network computer, a television, a mainframe, or any other data processing system or user device. Due to the ever changing nature of computers and networks, the description of computer system 1710 depicted in FIG. 17 is intended only as a specific example for purposes of illustrating embodiments of the present invention. Many other configurations of computer system 1710 are possible having more or less components than the computer system depicted in FIG. 17.

In one embodiment, the workload management system 122 hosted in the local data center 112 may include four computer systems. Each of the four computer systems may include a multi-core CPU, 64 GB of RAM, a 400 GB SSD, three 4 TB HDDs, and a network interface controller. In this case, the four computer systems may be in communication with the one or more networks 102 via the four network interface controllers. The four computer systems may comprise four nodes of a server cluster. The server cluster may comprise a set of four computer systems that are connected together via a network. The server cluster may be used for storing data associated with a plurality of virtual machines, such as backup data associated with a different point in time versions of 1000 virtual machines.

Some Particular Implementations

Some particular implementations and features are described in the following discussion.

One implementation of the disclosed technology includes a method of for recovering a first virtual machine with an Internet Protocol address, a first root volume and one or more data volumes that are corrupted. The first virtual machine is hosted by a first cloud server that hosts plurality of virtual machines. The disclosed method includes: (i) instructing the first cloud server to launch a recovery virtual machine; (ii) instructing the recovery virtual machine to launch one or more new data volumes based upon captured file system images in one or more snapshots taken of corrupted data volumes of the first virtual machine prior to becoming corrupted; (ii) instructing the recovery virtual machine to detach one or more corrupted data volumes; and (ii) instructing the recovery virtual machine to attach one or more new data volumes launched to the first virtual machine.

In some implementations, the method further includes that the Internet Protocol address of the first virtual machine remains unchanged.

In some implementations, the method further includes halting the first virtual machine prior detaching corrupted data volumes.

In some implementations, the method further includes restarting the first virtual machine after attaching new data volumes.

In some implementations, the method further includes instructing the recovery virtual machine to launch a new root volume based upon captured file system images in one or more snapshots taken of corrupted data volumes of the first virtual machine prior to becoming corrupted.

In some implementations, the method further includes instructing the recovery virtual machine to detach the first root volume.

In some implementations, the method further includes instructing the recovery virtual machine to attach the new root volume launched to the first virtual machine.

These methods and other implementations of the technology disclosed can include one or more of the following features and/or features described in connection with additional methods disclosed. In the interest of conciseness, the combinations of features disclosed in this application are not individually enumerated and are not repeated with each base set of features.

Another implementation may include a system, including one or more processors and memory coupled to the processors, containing computer instructions that, when executed on the processors, cause the system to find content in one or more virtual machines on one or more cloud servers according to any of the methods described earlier.

Yet another implementation may include a non-transitory computer-readable storage media storing instructions to find content in one or more virtual machines on one or more cloud servers, which instructions, when combined with computer hardware and executed, cause a computer to implement any of the methods described earlier. For purposes of this application, a computer-readable media does not include a transitory wave form.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method, comprising:
   identifying a plurality of system files that correspond to a pre-corruption state of one or more corrupted data volumes attached to a first virtual machine of a plurality of virtual machines hosted by a server, the plurality of system files comprising at least one base file and a combination of forward and reverse incremental files that indicate changes with respect to the at least one base file;
   generating, at a second virtual machine of the plurality of virtual machines hosted by the server, one or more backup data volumes based at least in part on the plurality of system files;
   detaching the one or more corrupted data volumes from the first virtual machine based at least in part on generating the one or more backup data volumes; and
   attaching the one or more backup data volumes to the first virtual machine after detaching the one or more corrupted data volumes from the first virtual machine.

2. The method of claim 1, wherein an Internet Protocol address of the first virtual machine remains accessible while the one or more corrupted data volumes are detached from the first virtual machine.

3. The method of claim 1, wherein the first virtual machine is assigned an Internet Protocol address prior to the plurality of system files being identified at a first time, and wherein the Internet Protocol address remains assigned to the first virtual machine throughout a time period spanning from the first time to a second time associated with the one or more backup data volumes being attached to the first virtual machine.

4. The method of claim 1, further comprising:
   halting the first virtual machine prior to detaching the one or more corrupted data volumes.

5. The method of claim 1, further comprising:
   restarting the first virtual machine after attaching the one or more backup data volumes.

6. The method of claim 1, further comprising:
   launching a root volume at the second virtual machine based at least in part on the plurality of system files.

7. The method of claim 6, further comprising:
   detaching a corrupted root volume from the first virtual machine; and
   attaching the root volume to the first virtual machine.

8. A data management system, comprising:
   one or more memories; and
   one or more processors, wherein the one or more memories store code comprising instructions executable, individually or collectively, by the one or more processors to cause the data management system to:
      identify a plurality of system files that correspond to a pre-corruption state of one or more corrupted data volumes attached to a first virtual machine of a plurality of virtual machines hosted by a server, the plurality of system files comprising at least one base file and a combination of forward and reverse incremental files that indicate changes with respect to the at least one base file;
      generate, at a second virtual machine of the plurality of virtual machines hosted by the server, one or more backup data volumes based at least in part on the plurality of system files;
      detach the one or more corrupted data volumes from the first virtual machine based at least in part on generating the one or more backup data volumes; and
      attach the one or more backup data volumes to the first virtual machine after detaching the one or more corrupted data volumes from the first virtual machine.

9. The data management system of claim 8, wherein an Internet Protocol address of the first virtual machine remains accessible while the one or more corrupted data volumes are detached from the first virtual machine.

10. The data management system of claim 8, wherein the first virtual machine is assigned an Internet Protocol address prior to the plurality of system files being identified at a first time, and wherein the Internet Protocol address remains assigned to the first virtual machine throughout a time period spanning from the first time to a second time associated with the one or more backup data volumes being attached to the first virtual machine.

11. The data management system of claim 8, wherein the instructions are further executable, individually or collectively, by the one or more processors to cause the data management system to:
   halt the first virtual machine prior to detaching the one or more corrupted data volumes.

12. The data management system of claim 8, wherein the instructions are further executable, individually or collectively, by the one or more processors to cause the data management system to:

restart the first virtual machine after attaching the one or more backup data volumes.

13. The data management system of claim 8, wherein the instructions are further executable, individually or collectively, by the one or more processors to cause the data management system to:

launch a root volume at the second virtual machine based at least in part on the plurality of system files.

14. The data management system of claim 13, wherein the instructions are further executable, individually or collectively, by the one or more processors to cause the data management system to:

detach a corrupted root volume from the first virtual machine; and attach the root volume to the first virtual machine.

15. A non-transitory, computer-readable medium storing code that comprises instructions that are executable, individually or collectively, by one or more processors of a data management system to cause the data management system to:

identify a plurality of system files that correspond to a pre-corruption state of one or more corrupted data volumes attached to a first virtual machine of a plurality of virtual machines hosted by a server, the plurality of system files comprising at least one base file and a combination of forward and reverse incremental files that indicate changes with respect to the at least one base file;

generate, at a second virtual machine of the plurality of virtual machines hosted by the server, one or more backup data volumes based at least in part on the plurality of system files;

detach the one or more corrupted data volumes from the first virtual machine based at least in part on generating the one or more backup data volumes; and attach the one or more backup data volumes to the first virtual machine after detaching the one or more corrupted data volumes from the first virtual machine.

16. The non-transitory, computer-readable medium of claim 15, wherein an Internet Protocol address of the first virtual machine remains accessible while the one or more corrupted data volumes are detached from the first virtual machine.

17. The non-transitory, computer-readable medium of claim 15, wherein the first virtual machine is assigned an Internet Protocol address prior to the plurality of system files being identified at a first time, and wherein the Internet Protocol address remains assigned to the first virtual machine throughout a time period spanning from the first time to a second time associated with the one or more backup data volumes being attached to the first virtual machine.

18. The non-transitory, computer-readable medium of claim 15, wherein the instructions are executable, individually or collectively, by the one or more processors to cause the data management system to:

halt the first virtual machine prior to detaching the one or more corrupted data volumes.

19. The non-transitory, computer-readable medium of claim 15, wherein the instructions are executable, individually or collectively, by the one or more processors to cause the data management system to:

restart the first virtual machine after attaching the one or more backup data volumes.

20. The non-transitory, computer-readable medium of claim 15, wherein the instructions are executable, individually or collectively, by the one or more processors to cause the data management system to:

launch a root volume at the second virtual machine based at least in part on the plurality of system files.

* * * * *